United States Patent
Suzuki

(10) Patent No.: US 10,359,938 B2
(45) Date of Patent: Jul. 23, 2019

(54) MANAGEMENT COMPUTER AND COMPUTER SYSTEM MANAGEMENT METHOD

(71) Applicant: HITACHI, LTD., Tokyo (JP)

(72) Inventor: Katsunori Suzuki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 78 days.

(21) Appl. No.: 15/538,695

(22) PCT Filed: Jan. 27, 2015

(86) PCT No.: PCT/JP2015/052227
§ 371 (c)(1),
(2) Date: Jun. 22, 2017

(87) PCT Pub. No.: WO2016/121005
PCT Pub. Date: Aug. 4, 2016

(65) Prior Publication Data
US 2018/0004425 A1    Jan. 4, 2018

(51) Int. Cl.
*G06F 12/00* (2006.01)
*G06F 3/06* (2006.01)
(Continued)

(52) U.S. Cl.
CPC .......... *G06F 3/0607* (2013.01); *G06F 3/0635* (2013.01); *G06F 3/0665* (2013.01);
(Continued)

(58) Field of Classification Search
None
See application file for complete search history.

(56) References Cited

U.S. PATENT DOCUMENTS 6,999,978 B2 *  2/2006  Frank .................. G06F 11/1466
8,327,000 B2 * 12/2012  Li ....................... H04L 67/1095
                                                        709/203
(Continued)

FOREIGN PATENT DOCUMENTS

JP    2009-134687 A    6/2009
JP    2013-045444 A    3/2013
(Continued)

OTHER PUBLICATIONS

"Resource Management with VMware DRS", 1998-2006, pp. 1-24, VMware, Inc. Palo Alto, CA, www.vmware.com.
(Continued)

*Primary Examiner* — John A Lane
(74) *Attorney, Agent, or Firm* — Mattingly & Malur, PC

(57) ABSTRACT

The management computer stores a configuration information of a storage, a configuration information of a host computer and a VM, an information on a service level of the VM, and a performance information of a storage subsystem and a network. If an access path that the host computer uses to access a volume is changed in response to a change of storage configuration, an I/O performance of the VM operating in the host computer may be changed. If the change of state of the storage is detected, the management computer calculates a change of state of whether a service level defined for the VM is satisfied, and selects an appropriate host computer in which the VM should be operated.

14 Claims, 15 Drawing Sheets

(51) Int. Cl.
  *G06F 13/10* (2006.01)
  *G06F 11/16* (2006.01)
(52) U.S. Cl.
  CPC ............ *G06F 3/0689* (2013.01); *G06F 11/16* (2013.01); *G06F 13/10* (2013.01)

(56) References Cited

U.S. PATENT DOCUMENTS

| | | | |
|---|---|---|---|
| 8,943,286 | B1 | 1/2015 | Watanabe et al. |
| 10,089,236 | B2 * | 10/2018 | Razin .................. G06F 12/0888 |
| 2009/0144393 | A1 | 6/2009 | Kudo |
| 2013/0031559 | A1 | 1/2013 | Alicherry |
| 2013/0047143 | A1 | 2/2013 | Chalmers et al. |
| 2013/0110966 | A1 | 5/2013 | Nagami et al. |
| 2014/0068210 | A1 | 3/2014 | Deguchi |
| 2014/0237306 | A1 | 8/2014 | Kabakura |
| 2015/0007177 | A1 | 1/2015 | Tobo |
| 2016/0203014 | A1 * | 7/2016 | Gschwind ........... G06F 9/45558 718/1 |
| 2018/0004564 | A1 * | 1/2018 | Konishi ................ G06F 3/0647 |
| 2018/0121247 | A1 * | 5/2018 | Kaul ..................... G06F 9/5077 |

FOREIGN PATENT DOCUMENTS

| | | |
|---|---|---|
| JP | 2014-049116 A | 3/2014 |
| JP | 2014-160329 A | 9/2014 |
| JP | 2014-529774 A | 11/2014 |
| JP | 5620614 B1 | 11/2014 |
| JP | 2015-007942 A | 1/2015 |
| WO | 2013/015905 A1 | 1/2013 |
| WO | 2014/002136 A1 | 1/2014 |

OTHER PUBLICATIONS

International Search Report of PCT/JP2015/052227 dated Apr. 28, 2015.

* cited by examiner

Fig.4
(a)
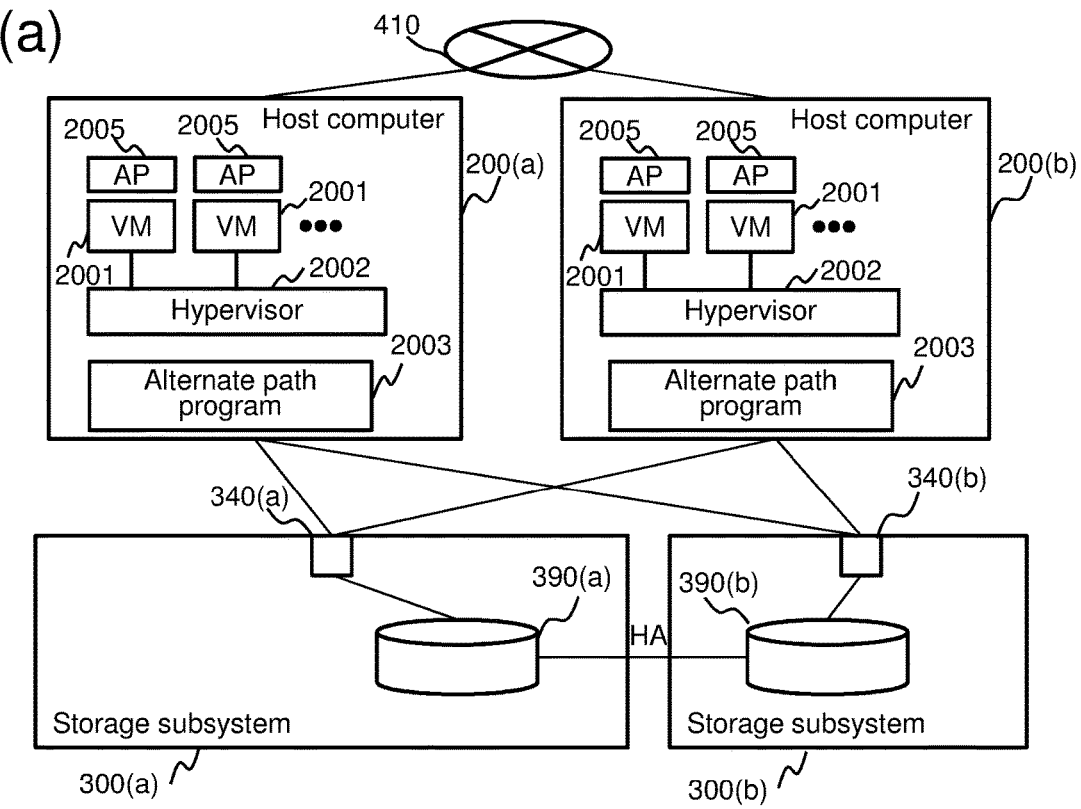
(b)
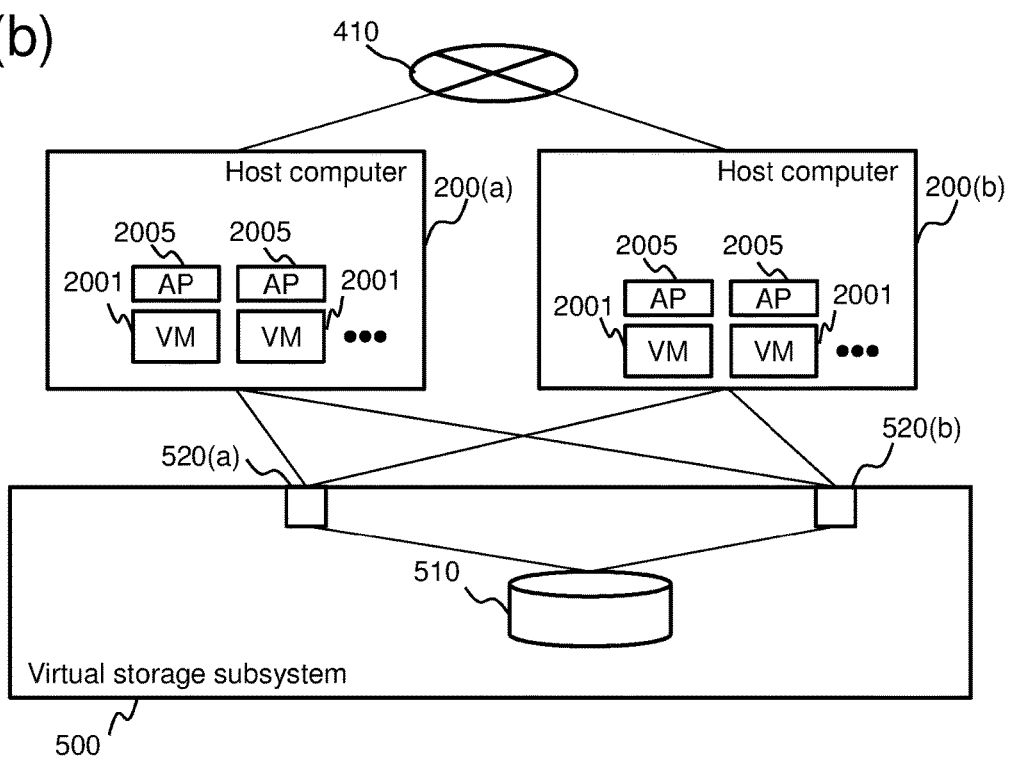

Storage-to-host connection management table

| Host ID | Storage ID | Storage port ID | Volume ID |
|---|---|---|---|
| HV1 | 001 | 11.11.11.11.11.11.11.11 | 002 |
| HV1 | 002 | 22.22.22.22.22.22.22.22 | 002 |
| HV2 | 001 | 11.11.11.11.11.11.11.11 | 002 |
| HV2 | 002 | 22.22.22.22.22.22.22.22 | 002 |
| ... | ... | ... | ... |

I/O amount management table

| Storage ID | Volume ID | Page ID | Average I/O data amount per second |
|---|---|---|---|
| 001 | 001 | 1 | 20 MB |
|  |  | 2 | 0 MB |
|  |  | 3 | 150 MB |
|  |  | ... | ... |
| 001 | 002 | 1 | 90 MB |
|  |  | 2 | 50 MB |
|  |  | ... | ... |
| ... | ... | ... | ... |

| Resource performance table | | | 1122 |
|---|---|---|---|
| Resource classification | Amount of I/O data per unit time | Response time | |
| SSD | 50 MB | 0.5 ms | |
| | 100 MB | 0.7 ms | |
| | . . . | . . . | |
| SAS | 50 MB | 2 ms | |
| | 100 MB | 4 ms | |
| | . . . | . . . | |
| SATA | 50 MB | 3 ms | |
| | 100 MB | 10 ms | |
| | ... | ... | |

| Network performance management table | | | |
|---|---|---|---|
| Host ID | Storage ID | Storage port ID | RTT |
| HV1 | 001 | 11.11.11.11.11.11.11.11 | 1 ms |
| HV1 | 002 | 22.22.22.22.22.22.22.22 | 15 ms |
| HV2 | 001 | 11.11.11.11.11.11.11.11 | 13 ms |
| HV2 | 002 | 22.22.22.22.22.22.22.22 | 2 ms |

112301　　112302　　　112303　　　112304

1131

| Volume access path management table | | | | |
|---|---|---|---|---|
| Host ID | Storage ID | Volume ID | Storage port ID | Status |
| HV1 | 100 | 101 | 11.11.11.11.11.11.11.11 | Primary |
|  |  |  | 22.22.22.22.22.22.22.22 | Secondary |
| HV1 | 100 | 102 | 11.11.11.11.11.11.11.11 | Unavailable |
|  |  |  | 22.22.22.22.22.22.22.22 | Primary |
| HV2 | 100 | 101 | 11.11.11.11.11.11.11.11 | Secondary |
|  |  |  | 22.22.22.22.22.22.22.22 | Primary |
| HV2 | 100 | 102 | 11.11.11.11.11.11.11.11 | Unavailable |
|  |  |  | 22.22.22.22.22.22.22.22 | Secondary |
| HV2 | 100 | 103 | 22.22.22.22.22.22.22.22 | Primary |
| HV2 | 002 | 004 | 22.22.22.22.22.22.22.22 | Primary |

113101   113102   113103   113104   113105

1132

| VM volume correspondence management table | | |
|---|---|---|
| VM ID | Storage ID | Volume ID |
| VM1 | 100 | 101 |
| VM2 | 100 | 102 |
| VM3 | 100 | 103 |
| VM4 | 002 | 004 |

113201   113202   113203

MANAGEMENT COMPUTER AND COMPUTER SYSTEM MANAGEMENT METHOD

TECHNICAL FIELD

The present invention relates to a technique for managing a computer system including a storage subsystem.

BACKGROUND ART

One technique for improving availability of applications in case hardware failure occurs is a technique in which an HA (High Availability) configuration is adopted in a storage subsystem. Patent Literature 1 discloses providing a same virtual volume ID to two real volumes, a first real volume of a first storage subsystem and a second real volume of a second storage subsystem connected to the first storage subsystem, such that one virtual volume is provided to a host computer, wherein if the host computer writes data to the first real volume, the first storage subsystem writes data to the first real volume and also transfers the data to the second storage subsystem, and the second storage subsystem writes the received data to the second real volume, by which the HA configuration is realized.

On the other hand, the improvement of performance of the host computer has enabled a virtual host computer (Virtual Machine: VM) to operate on a physical host computer. Further, a technique (Distributed Resource Scheduler) for changing the host computer on which the VM operates among host computers is known (refer for example to Non-Patent Literature 1).

CITATION LIST

Patent Literature

[PTL 1] PCT International Publication No. 2014/002136
[NPL 1] http://www.vmware.com/pdf/vmware_drs_wp-.pdf

SUMMARY OF INVENTION

Technical Problem

According to Patent Literature 1, the first real volume and the second real volume configuring the HA configuration is recognized as an identical volume from the host computer. Further, the access paths to respective real volumes constructing the HA configuration are recognized as a plurality of alternate paths to a single virtual volume from the host computer. Therefore, if a path to a certain real volume constituting the HA becomes unavailable from the host computer due to reasons such as failure, the path to be used is switched via a path management function of the host computer, and the host computer continues I/O to a different real volume.

Though the host computer can issue I/O to a plurality of volumes in a plurality of computers according to the above process, the host computer cannot recognize the storage subsystem in which the real volume that the host computer actually accesses is located.

From the viewpoint of disaster recovery, the HA configuration can be constructed using real volumes of storage subsystems located at remote data centers. Even in such arrangement, if failure occurs to the real volume and the real volume cannot be accessed, the host computer changes the access destination to the real volume of the storage subsystem of a remote data center to continue the I/O. However, after changing the access path, the host computer has to access a remote data center, so the I/O performance to the volume is deteriorated.

At this time, if the VM is operated on a host computer, the I/O performance from the VM can be recovered by migrating the VM to the host computer within the data center to which the storage subsystem being the actual access destination belongs. However, if the volume accessed by the VM adopts the HA configuration, the host computer cannot recognize the storage subsystem in which the volume being accessed is actually located, and therefore, it cannot select an appropriate host computer as the destination for migrating the VM that enables to improve the I/O performance.

In consideration of the problems described above, the present invention aims at providing a management computer and a management method of a computer system, that enable to select an appropriate host computer on which the VM operates, even if the state of configuration of the storage subsystem has been changed.

Solution to Problem

According to one aspect of the present invention, a management computer manages a computer system configured of a plurality of host computers and a storage system including one or more storage subsystems connected via a network. The storage system has a volume provided with a plurality of access paths from the host computer. The management computer manages a configuration information of the volumes and host computers, a performance information of the computer system, and a requested service level of an object executed in the host computer.

If the management computer detects that there has been a change in the configuration of the storage system, it computes service levels capable of being provided if the object is executed in each of the host computers based on the configuration information and the performance information, and selects the host computer capable of satisfying the requested service level based on the computed results.

Advantageous Effects of Invention

According to the present invention, appropriate VM arrangement and access path to the storage can be selected in a state where the state of the storage subsystem had been changed.

BRIEF DESCRIPTION OF DRAWINGS

FIG. 4 is a block diagram illustrating a virtual storage subsystem, and a logical configuration of the storage subsystem and host computers.

FIG. 10 is an example of a table managing a physical connection between storages and host computers.

FIG. 11 is an example of a table managing information of an I/O amount issued to the volume.

FIG. 12 is an example of a table managing a performance information of a physical resource.

FIG. 13 is an example of a table managing a performance information of a network.

DESCRIPTION OF EMBODIMENTS

Figure 1:
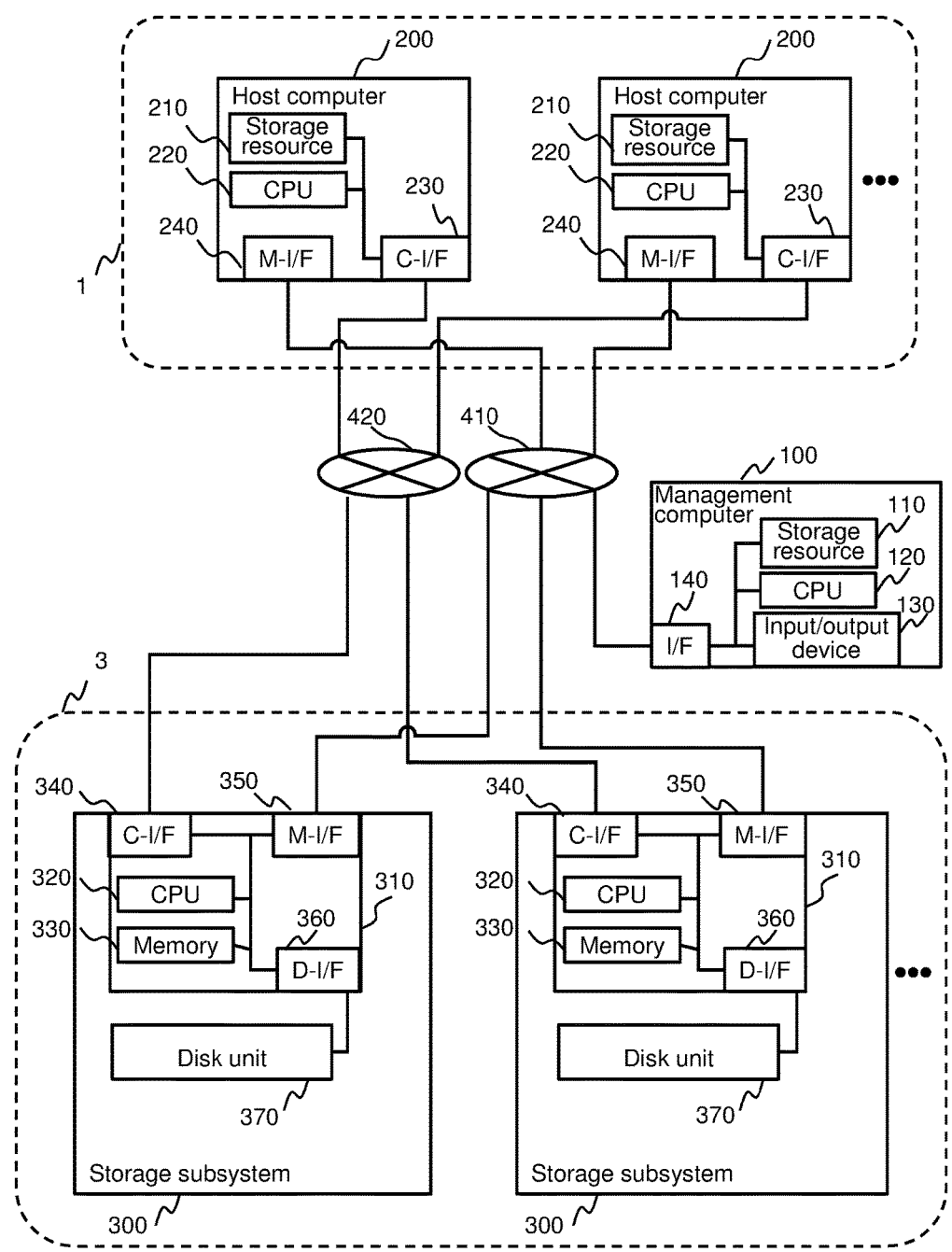
FIG. 1 is a configuration diagram of a computer system.

Now, the preferred embodiments of the present invention will be described with reference to the drawings. In the following description, various information are referred to as "xxx tables", for example, but the various information can also be expressed by data structures other than tables. Further, the "xxx table" can also be referred to as "xxx information" to shows that the information does not depend on the data structure.

In the following description, processes are sometimes described using the term "program" as the subject, but actually, a program is executed by a processor (such as a CPU (Central Processing Unit)) included in a computer or a controller for performing determined processes using storage resources (such as memories) and/or communication interface devices (such as communication ports) as required. Therefore, the processes described with the program set as the subject can be recognized as processes performed by a processor or a management system (such as a management computer (a server, for example)) using the processor. In order to prevent lengthy description, the processes may be described with the program set as the subject. Further, the programs can be installed to each computer or to each controller from a program source. The program source can be a program distribution server or a storage media, for example.

A management computer includes an input/output device. A display, a keyboard and a pointer device can be considered as examples of the input/output device, but other devices can also be included. Further, a configuration can be adopted where a displaying computer having a display or a keyboard or a pointer device is connected to a serial interface or an Ethernet (Registered Trademark) interface that the management computer has, and the displaying computer can be used as an alternative means of the input/output device. In that case, the management computer causes the displaying computer to display information by sending information for display to the displaying computer, and receives input of information from the displaying computer by receiving input information from the displaying computer.

Hereafter, an assembly of one or more computers for managing a computer system and managing and controlling a storage system may be referred to as a management system. When the management computer displays information for display, the management computer is the management system. Further, a combination of a management computer and a displaying computer may also be the management system. Further, a plurality of computers can be used to realize an equivalent processing as the management computer for enhancing the speed or enhancing the reliability of the management processing, and in that case, the relevant plurality of computers (which may include the computer for display if the display is realized by the computer for display) constitutes the management system.

In the following description, the term "time" is used, and the term time can designate information such as year, month and day, or can designate hour, minute and second (including seconds below the decimal point).

First Embodiment (1-1) Outline of Present Embodiment

A VM operating on a host computer stores its disk image in a storage area of the host computer or a volume of the storage subsystem. In a state where the host computer cannot access the disk image of the VM, the VM cannot be operated. The availability of the VM may be improved and the disk image of the VM may be protected by adopting an HA configuration in the volume storing the disk image of the VM where data is duplicated (mirrored) in two (or more) storage subsystems. When the HA configuration is adopted, if the host computer cannot access one of the volumes among the plurality of volumes where data is mirrored, the host automatically changes the access destination to a different volume to continue the I/O to the volume.

Further, from the viewpoint of disaster recovery, the HA configuration can be constructed using storage subsystems that are geographically remote. In the HA configuration of a plurality of storage systems disposed in remote data centers, the access time from the host computer to the volume may differ greatly depending on the path to the volume that the host computer uses. For example, if a path for accessing the storage subsystem installed in the same data center as the host computer is used, the access time to the volume is short, but if a path for accessing a storage subsystem located in a remote data center is used, the access time to the volume is long.

In such environment, in a state where the host computer uses the access path to the storage located in a remote data center due to a failure or the like of the real volume of the storage subsystem located within its own data center, the access time to the volume will be elongated.

The access time to the volume can be improved by migrating the VM so that the VM is operated in the host computer within the same data center as the storage in which the volume is actually retained. However, the location (geographic location) of the real volume cannot be comprehended from the host computer or from the VM. Therefore, if the VM is migrated without considering the location of the real volume, the VM may not be migrated to the host computer located in the same data center as the storage actually retaining the volume, but to the host computer in other data center. In that case, the access time to the volume cannot be improved as a result.

The aforementioned case may occur even in cases other than when the HA configuration is constructed in the storage subsystem. However, the following description mainly describes an example of the method for selecting an appropriate host computer for having the VM operate in an environment where the HA configuration is constructed in the storage subsystem, in which a portion of the access paths to the volume becomes unavailable due to the change of the state of the storage.

(1-2) Hardware Configuration of Computer System

FIG. 1 illustrates a configuration example of a computer system according to the first embodiment. The computer system is at least composed of a group of computers 1 including one or more host computers 100, a management computer 100, and a storage system 3 including one or more storage subsystems 300, which are mutually connected via a network. The storage subsystem 300 is connected via a first communication network 410 such as LAN (Local Area Network) to the management computer 100 and the host computer 200. Further, the storage subsystem 300 is connected to the host computer 200 via a second communication network 420 such as SAN (Storage Area Network). Further, the first communication network 410 and the second communication network 420 can be formed integrally. Moreover, the host computer 200 and the management computer 100 can be identical computer. FIG. 1 illustrates an example of a computer system including two host computers, two storage subsystems and one management computer, but the numbers of the apparatus are not restricted thereto. Each apparatus can be located in geographically different locations. For example, the two storage subsystems 300 illustrated in FIG. 1 can be located respectively at different locations.

The management computer 100 has a storage resource 110, a CPU 120, an input/output device 130, and an I/F 140, for example. The I/F 140 is, for example, an NIC (Network Interface Controller).

The storage resource 110 is a memory, such as a DRAM. However, an auxiliary storage device such as an HDD can be included in the storage resource 110. The storage resource 110 stores computer programs described later and various information. The computer program is executed by the CPU 120.

The management computer 100 acquires various information such as configuration information of the storage subsystem 300 and the host computer 200, performance information, and the like, and based on these information, performs a process to manage the storage subsystem 300 and the host computer 200. As a different embodiment, it is possible to manage the storage subsystem 300 and the host computer 200 by different management computers 100, wherein the management computers 100 communicate with each other. When there are multiple host computers 200, the respective host computers 200 can be managed by different management computers 100, and the management computers 100 can be made to communicate with each other. When there are multiple management computers 100 constituting a mutually communicating management system, not necessarily all the management computers 100 are required to retain all the computer programs and various information, but the management system as a whole should retain computer programs and various information described later.

The host computer 200 is configured to include, for example, a storage resource 210, a CPU 220, a communication interface (hereinafter referred to as C-I/F) 230, and a management interface (hereinafter referred to as M-I/F) 240.

The storage resource 210 is, for example, a memory such as a DRAM. However, the storage resource 210 may include an auxiliary storage device such as a HDD. The storage resource 210 stores an OS (Operating System) or images during execution of an operating VM, for example. The CPU 220 executes a computer program stored in the storage resource 210. The C-I/F 230 is an HBA (Host Bus Adapter), for example. The M-I/F 240 is an NIC (Network Interface Controller), for example.

The storage subsystem 300 includes, for example, a disk unit 370 including a plurality of physical storage resources, and a controller 310 connected to the disk unit 370.

The controller 310 includes, for example, a CPU 320, a memory 330 connected to the CPU 320, a C-I/F 340, an M-I/F 350, and a device interface (hereinafter referred to as D-I/F) 360.

The memory 330 stores computer programs executed by the CPU 320 and various information.

The C-I/F 340 is a communication interface device for communicating via the second communication network 420. In the present specification, the C-I/F 340 is sometimes referred to as "port" or "storage port".

The M-I/F 350 is a communication interface for communicating via the first communication network 410, and it can be an NIC, for example.

The D-I/F 360 is a communication interface device for the controller 310 to communicate with the disk unit 370. The D-I/F 360 can be prepared for each type of physical resource 380 included in the disk unit 370.

The above description illustrates a configuration example such as the hardware of the computer system according to the present embodiment. The communication interface devices used in the M-I/F or the C-I/F described previously are not restricted to HBA and NIC. The communication interface device differs according to the type of network to which the I/F is connected, or the type of the apparatus using the I/F.

Figure 2:
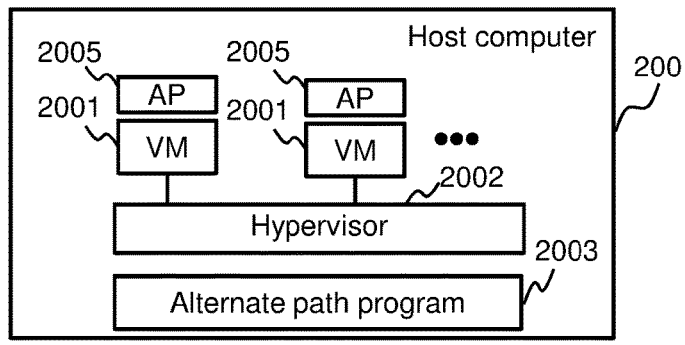
FIG. 2 is a block diagram illustrating a logical configuration of a host computer.

Next, we will describe the logical configuration of the host computer 200 and the storage subsystem 300. FIG. 2 illustrates a logical configuration of the host computer 200. The host computer 200 has a hypervisor (hereinafter also referred to as HV) 2002 capable of logically generating and operating a VM 2001, which is a virtual host computer. The HV 2002 can operate a plurality of VMs 2001 at once. Each VM 2001 can execute an application program (AP) 2005 as if it is a stand-alone physical computer. The host computer 200 executes an alternate path program 2003. If there are a plurality of access routes (called paths) from the host computer 200 to a certain volume (logical unit), the alternate path program 2003 has a function to recognize the paths, and to select the path to be used among the plurality of paths when accessing the logical volume. Further, if a certain path cannot be used when accessing the volume, a different path (alternate path) is selected among the plurality of paths, and access is performed using this alternate path. The alternate path program 2003 executes these processes transparently to the VM 2001 or the AP 2005.

Figure 3:
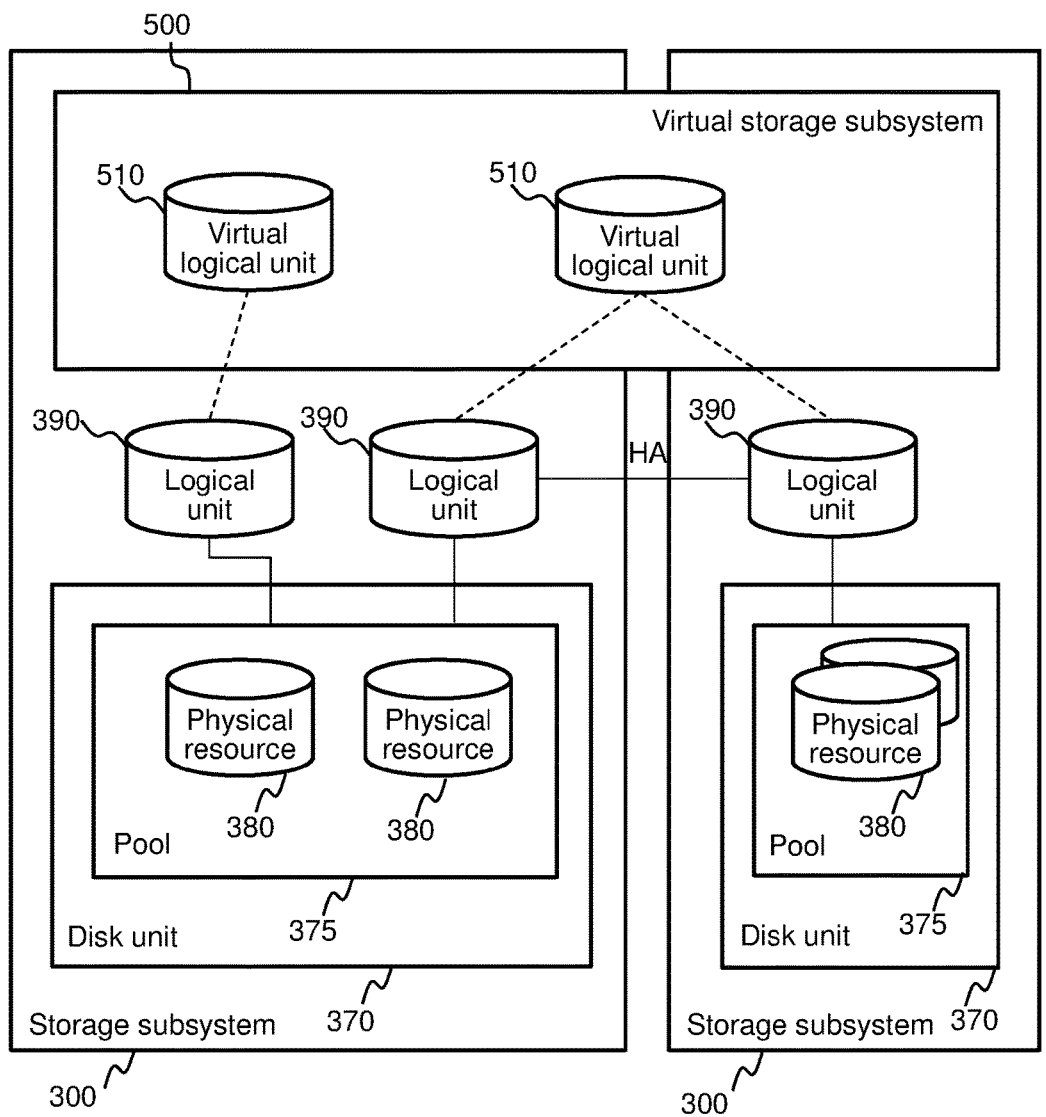
FIG. 3 is a block diagram illustrating a logical configuration of storage subsystems.

FIG. 3 illustrates a logical configuration of the storage subsystem 300. The storage subsystem 300 has a plurality of physical resources 380 which are physical storage media disposed within the disk unit 370.

The physical resource 380 is a physical storage media such as an SSD (Solid State Drive), an SAS (Serial Attached SCSI)—HDD, or an SATA (Serial Advanced Technology Attachment)—HDD.

Further, the physical resource 380 can be an external volume that mounts a created real volume to an external storage subsystem (not shown) connected to the storage subsystem 300, and manages the volume as a storage area of a certain storage subsystem 300.

The storage subsystem 300 constitutes one or more pools 375 from one or more physical resources 380. Further, the storage subsystem 300 can create a logical unit 390 using the storage area of the physical resource 380 constituting the pool 375. Here, the logical unit 390 can be a logical unit in which a physical storage area allocated in advance, or can be a logical unit 390 which is configured using thin provisioning technique. Thin provisioning is a technique for providing a virtual storage area to the host computer 200 without securing a physical storage to be allocated to the logical unit in the initial state. When an access request to the virtual storage area is received from the host computer 200, the physical storage area to be allocated to the storage area is secured.

The pool 375 is a storage area capable of generating a logical unit 390. Specifically, it can be a RAID (Redundant Arrays of Inexpensive Disks) group composed of a plurality of physical 380, or can be a thin provisioning pool providing a storage area dynamically when data is written to the thin-provisioning logical unit 390. In the case of a thin-provisioning pool, the pool 375 can be composed of one or more types of physical resources 380.

In FIG. 3, the two storage subsystems 300 can make the logical unit 390 to which the host computer 200 accesses seem like a volume within a single virtual storage subsystem to the host computer 200. This virtual storage subsystem is called a virtual storage subsystem 500. Further, the volume within the virtual storage subsystem is called a virtual logical unit 510. The user (administrator) of the storage subsystem 300 can map the logical unit 390 within the storage subsystem 300 to the virtual logical unit 510 within the virtual storage 300.

Moreover, the storage subsystem 300 can provide the plurality of logical units 390 having an HA configuration described later set thereto as if they were a single virtual logical unit 510 to the host computer 200. When an HA configuration is set, all the logical units 390 having the HA configuration set are mapped to one virtual logical unit 510 within a certain virtual storage 500.

Each storage subsystem 300 constituting the virtual storage subsystem 500 stores a mapping table of an identification information of the virtual storage subsystem 500 and an identification information of the actual storage subsystem 300 in the memory 330. Similarly, it stores a mapping table of an identification information of the virtual logical unit 510 and an identification information of the actual logical unit 390 in the memory 330. The actual contents of the virtual logical unit 510 and the HA configuration will be described below with reference to FIG. 4.

In the present specification, the virtual logical unit may be referred to as a virtual volume, the logical unit as a real volume, and the virtual logical unit and the logical unit as a volume, collectively.

FIG. 4 illustrates a schematic diagram of the logical relationship between the storage subsystem 300, the virtual storage subsystem 500 and the host computer 200. The upper section (a) of FIG. 4 shows a physical connection between the storage subsystem 300 and the host computer 200. Here, an example is described where the logical unit 390 (a) within the storage subsystem 300 (a) and the logical unit 390 (b) within the storage subsystem 300 (b) have HA configurations set thereto. But the computer system according to the present embodiment can include a logical unit 390 having no HA configuration set thereto.

The host computers 200 (a) and 200 (b) are respectively physically connected to the C-I/F 340 of the storage subsystems 300 (a) and 300 (b). Further, LUN masking with respect to the host computers 200 (a) and 200 (b), or other settings is applied to each of the logical units 390 (a) and 390 (b). In the example of FIG. 4, LUN masking settings are applied such that both the host computers 200 (a) and 200 (b) can access the logical units 390 (a) and 390 (b).

The VM 2001 is operating on the host computers 200 (a) and 200 (b). Further, based on an instruction from the management software of the VM 2001, the VM 2001 which has operated on the host computer 200 (a) can be executed by the host computer 200 (b) (the VM 2001 can be migrated).

FIG. 4 illustrates an example where disk image data of a certain VM 2001 is retained in a duplicated manner in the logical units 390 (a) and 390 (b). For example, when the storage subsystem 300 (a) receives a data write request to the logical unit 390 (a) from the host computer 200 (a), the storage subsystem 300 (a) first writes data to the logical unit 390 (a) and then writes the same data to the storage subsystem 300 (b). Specifically, the storage subsystem 300 (a) transmits a command to instruct write of that data to the storage subsystem 300 (b). When the storage subsystem 300 (b) receives the data write command from the storage subsystem 300 (a), it writes data to the logical unit 390 (b), and notifies the result (that write has been completed) to the storage subsystem 300 (a). After confirming that write has been performed both to the logical units 390 (a) and 390 (b), the storage subsystem 300 (a) notifies the result of data write (that data write has been completed) to the host computer 200 (a).

Since the write data of the VM 2001 is duplicated by the storage subsystems 300 (a) and 300 (b) to the logical units 390 (a) and 390 (b), the VM 2001 can access either one of the logical units 390 (a) and 390 (b) to read the disk image data. If the VM 2001 issues a read command to read data in the logical unit 390 (a) to the storage subsystem 300 (a), the storage subsystem 300 (a) reads data from the logical unit 390 (a) and returns the same to the VM 2001. On the other hand, if the VM 2001 issues a read command to read the data of the logical unit 390 (b) in the storage subsystem 300 (b), the storage subsystem 300 (b) reads the data from the logical unit 390 (b) and returns the same to the VM 2001.

The conceptual diagram of a storage configuration recognized by the VM 2001 or an AP 2005 operating on the host computers 200 (a) and 200 (b) is illustrated in the lower section (b) of FIG. 4 when the physical configuration as illustrated in the upper section (a) of FIG. 4 is constructed. In this configuration, the VM 2001 or the AP 2005 will not recognize that the logical unit 390 (a) exists in the storage subsystem 300 (a) and that the logical unit 390 (b) exists in the storage subsystem 300 (b). Conversely, it recognizes that a single virtual logical unit 510 exists. In the present specification, the state where data is duplicated in the logical units 390 (a) and 390 (b) and where the logical units 390 (a)

and 390 (*b*) are recognized as a single (same) virtual logical unit 510 by the host computer 200 (more accurately, by the VM 2001 or the AP 2005) (set by the administrator of the storage subsystem 300) is called "the HA configuration is set".

Both the logical units 390 (*a*) and 390 (*b*) in which the HA configuration is set have the same identification information. Specifically, they have the identifier of the virtual storage subsystem 500 and the identifier of the virtual logical unit 510 as identification information. We will describe a case where the identifier of the virtual storage subsystem 500 is X and the identifier of the virtual logical unit 510 is x. If the alternate path programs 2003 executed in the host computers 200 (*a*) and 200 (*b*) inquire the identification information of the logical units 390 (*a*) and 390 (*b*) to the storage subsystems 300 (*a*) and 300 (*b*), the storage subsystem 300 (*a*) returns a response stating that the identifier of the storage subsystem to which the logical unit 390 (*a*) belongs is X and the identifier of the logical unit 390 (*a*) is x. Similarly, the storage subsystem 300 (*b*) also returns a response stating that the identifier of the storage subsystem to which the logical unit 390 (*b*) belongs is X and the identifier of the logical unit 390 (*b*) is x. Thereby, the alternate path programs 2003 executed in the host computers 200 (*a*) and 200 (*b*) recognizes that the logical units 390 (*a*) and 390 (*b*) are identical volume (virtual logical unit 510) and that there exists two access paths passing the C-I/F 520 (*a*) and 520 (*b*) indicated in the virtual storage subsystem 500 to the virtual logical unit 510. The alternate path program 2003 provides only the virtual logical unit 510 to the VM 2001 or the AP 2005. Therefore, the VM 2001 or the AP 2005 will not recognize the presence of the logical units 390 (*a*) and 390 (*b*) mapped to the virtual logical unit 510. Further, it will not recognize that the logical units 390 (*a*) and 390 (*b*) exist in different storage subsystems (storage subsystems 300 (*a*) and 300 (*b*)).

If the host computers 200 (*a*) and 200 (*b*) are connected via a first communication network, the management software of the VM 2001 can migrate the VM 2001 from the host computer 200 (*a*) to 200 (*b*) (and vice versa). However, if the logical unit 390 in which the disk image of the VM 2001 is stored is a logical unit 390 that cannot be accessed from the host computer (b) (that has no access path), if the VM 2001 having been executed in the host computer 200 (*a*) is migrated to the host computer 200 (*b*), the VM 2001 cannot be executed by the host computer 200 (*b*). Therefore, the condition under which the VM 2001 can be migrated is that the host computers 200 (*a*) and 200 (*b*) are in a state capable of accessing (having access paths to) the same volume (logical unit or virtual logical unit), in addition to the host computers 200 (*a*) and 200 (*b*) being connected via the first communication network. In the configuration of FIG. 4, since the host computers 200 (*a*) and 200 (*b*) are connected via a first communication network, and access paths from the host computers 200 (*a*) and 200 (*b*) to the same volume (logical unit or virtual logical unit) exist, the migration of the VM 2001 is enabled between the host computers 200 (*a*) and 200 (*b*).

Figure 5:
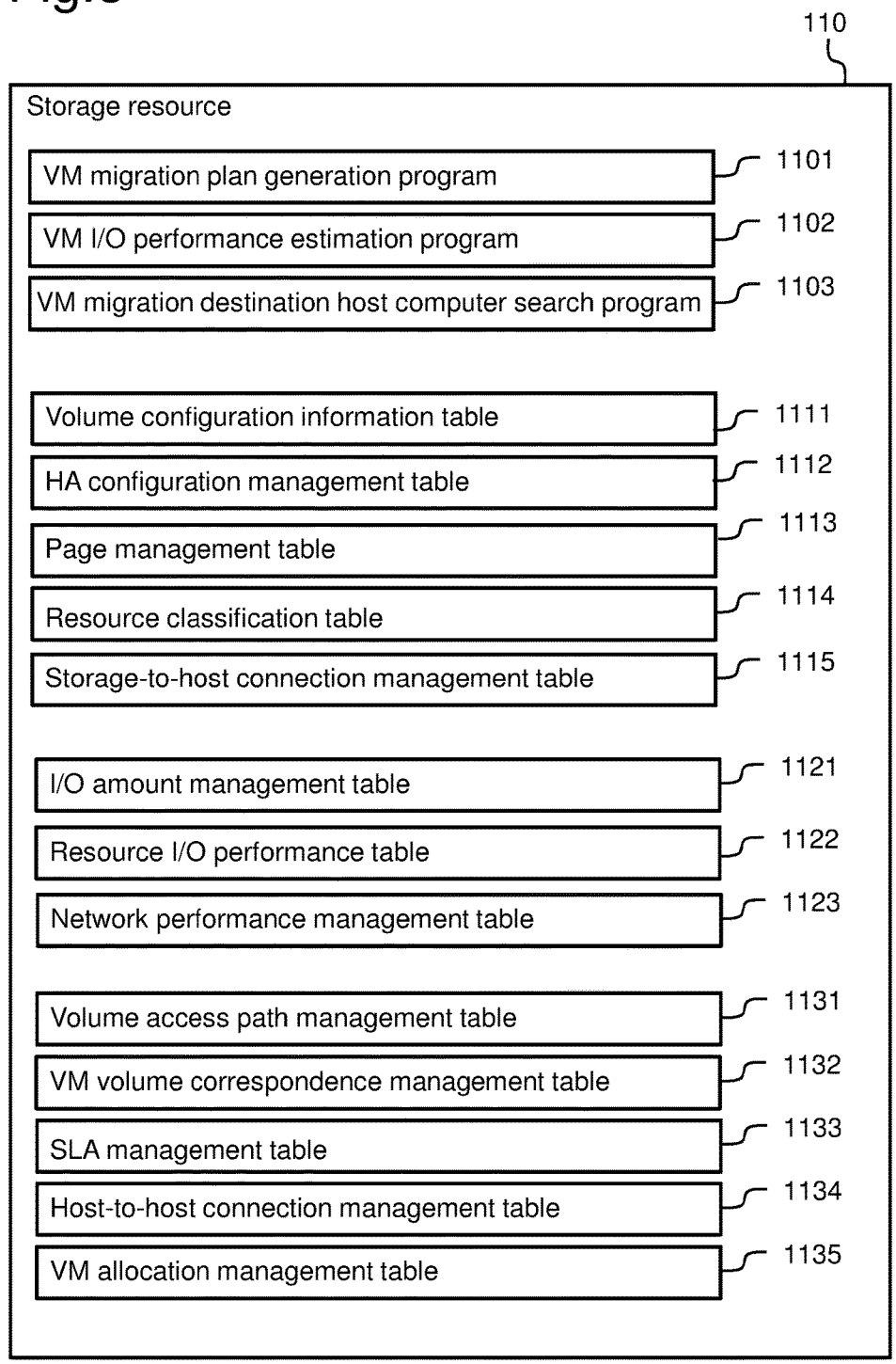
FIG. 5 is a block diagram illustrating an internal configuration of storage resources of a management computer.

Next, the various management information managed by the management computer 100 will be described. FIG. 5 is a logical configuration diagram illustrating computer programs and various information that the management computer 100 stores in the storage resource 110.

Computer programs stored in the storage resource 110 include a VM migration plan generation program 1101, a VM I/O performance estimation program 1102, and a VM migration destination host computer search program 1103.

The information stored in the storage resource 110 includes, as storage configuration information, a volume configuration information table 1111, an HA configuration management table 1112, a page management table 1113, a resource classification table 1114, and a storage-to-host connection management table 1115.

The information stored in the storage resource 110 include, as performance information, an I/O amount management table 1121, a resource I/O performance table 1122, and a network performance management table 1123.

The information stored in the storage resource 110 include, as information related to the host computer 200 and the VM 2001, a volume access path management table 1131, a VM volume correspondence management table 1132, an SLA management table 1133, a host-to-host connection management table 1134, and a VM allocation management table 1135. The respective tables store information of the VMs 2001 of all the host computers 200 and the logical units 390 (or the virtual logical units 510) of all the storage subsystems 300 managed by the management computer 100.

(1-3) Contents of Tables

Figure 6:
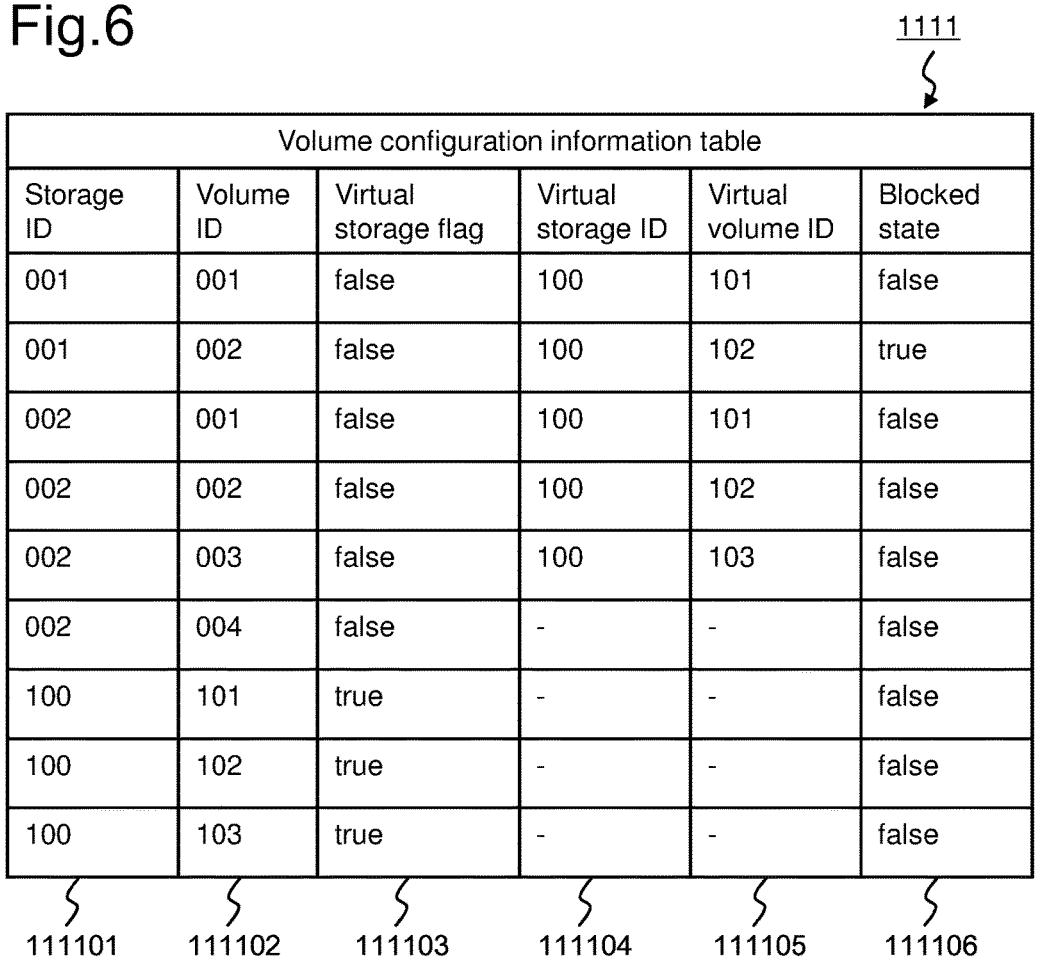
FIG. 6 is an example of a table managing volumes.

FIG. 6 is a table illustrating the contents of the volume configuration information table 1111 stored in the storage resource 110 of the management computer 100. The volume configuration information table 1111 is a table managing the configuration information of the logical unit 390 and the virtual logical unit 510, and includes, as shown in FIG. 6, a storage ID 111101, a volume ID 111102, a virtual storage flag 111103, a virtual storage ID 111104, a virtual volume ID 111105, and a blocked state 111106.

The storage ID 111101 is identification information of the storage subsystem 300 or the virtual storage subsystem 500. The volume ID 111102 is identification information of the logical unit 390 or the virtual logical unit 510.

In the virtual storage flag 111103, a "true" value is set when the relevant record indicates information related to the virtual storage subsystem 500, and a "false" value is set when it indicates information related to a normal, non-virtualized, storage subsystem 300.

In the virtual storage ID 111104, if the virtual storage flag 111103 is "false" and the logical unit 390 is mapped to the virtual logical unit 510, an identification information of the virtual storage subsystem 500 having the virtual logical unit 510 corresponding to the logical unit 390 is set. In other cases, a value such as "-" is set to show that there is no corresponding value.

In the virtual volume ID 111105, an identification information of the virtual logical unit 510 corresponding to the logical unit 390 is set if the virtual storage flag 111103 is "false" and the logical unit 390 is mapped to the virtual logical unit 510. In other cases, a value such as "-" is set to show that there is no corresponding value.

In the blocked state 111106, "true" is set if the logical unit 390 or the virtual logical unit 510 is in an unavailable state, and "false" is set in other cases. If a plurality of logical units 390 are mapped to the virtual logical unit 510, "true" is set when all the corresponding logical units 390 are in an unavailable state.

The management computer 100 periodically communicates with the storage subsystem 300, acquires information to be stored in the volume configuration information table 1111 from the storage subsystem 300, and updates the contents of the volume configuration information table 1111. It is also possible to acquire the information to be held in the volume configuration information table 1111 from the storage subsystem 300 if the user performs an information acquisition operation using the management computer 100.

Figure 7:
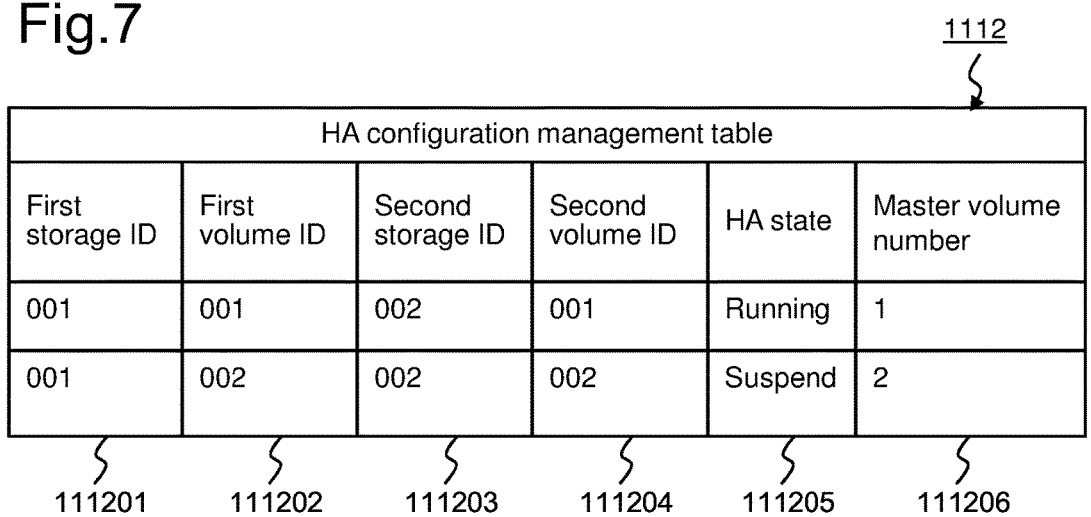
FIG. 7 is an example of a table managing the relationship of HA configuration.

FIG. 7 is a table showing the contents of the HA configuration management table 1112 stored in the storage resource 110 of the management computer 100. The HA configuration management table 1112 is a table for managing the configuration information of the HA configuration set among the logical units 390, and as shown in FIG. 7, it includes information of a first storage ID 111201, a first real volume ID 111202, a second storage ID 111203, a second real volume ID 111204, an HA state 111205, and a master volume number 111206.

The first storage ID 111201 and the second storage ID 111203 are identification information of the storage subsystem 300 including the logical unit 390 in which the HA configuration is set.

A first volume ID 111202 and a second volume ID 111204 are identification information of the logical unit 390 in which the HA configuration is set. The logical unit 390 specified by the first volume ID 111202 belongs to the storage subsystem 300 specified by the first storage ID 111201. The logical unit 390 specified by the second volume ID 111204 belongs to the storage subsystem 300 specified by the second storage ID 111203.

The HA state 111205 is information indicating the state of the HA, and values such as "Running" indicating that the data is duplicated normally or "Suspend" indicating that the duplication of data is stopped due to some cause are set.

The master volume number 111206 indicates the number of the logical unit being the master in the logical unit 390 having the HA configuration set. A master of the HA configuration means the logical unit 390 which always stores the latest data when the pair state becomes "Suspend". Therefore, the storage subsystem 300 performs control such as to always write data to the master logical unit 390 if data is written to the logical unit 3990 of the HA configuration. If "1" is set in the master volume number 111206, it means that the logical unit 390 indicated by the first volume ID 111202 is the master. If "2" is set in the master volume number 111206, it means that the logical unit 390 indicated by the second volume ID 111204 is the master.

The present embodiment has illustrated a case where the HA configuration is set between two logical units 390, but the number of logical units capable of setting up an HA configuration is not restricted thereto. For example, the HA configuration management table 1112 can be composed of information of three or more logical units 390, the HA state, and the master information.

The management computer 100 communicates with the storage subsystem 300 and updates information stored in the HA configuration management table 1112 either periodically or when an operation (instruction) to acquire information is received from the user.

Figure 8:
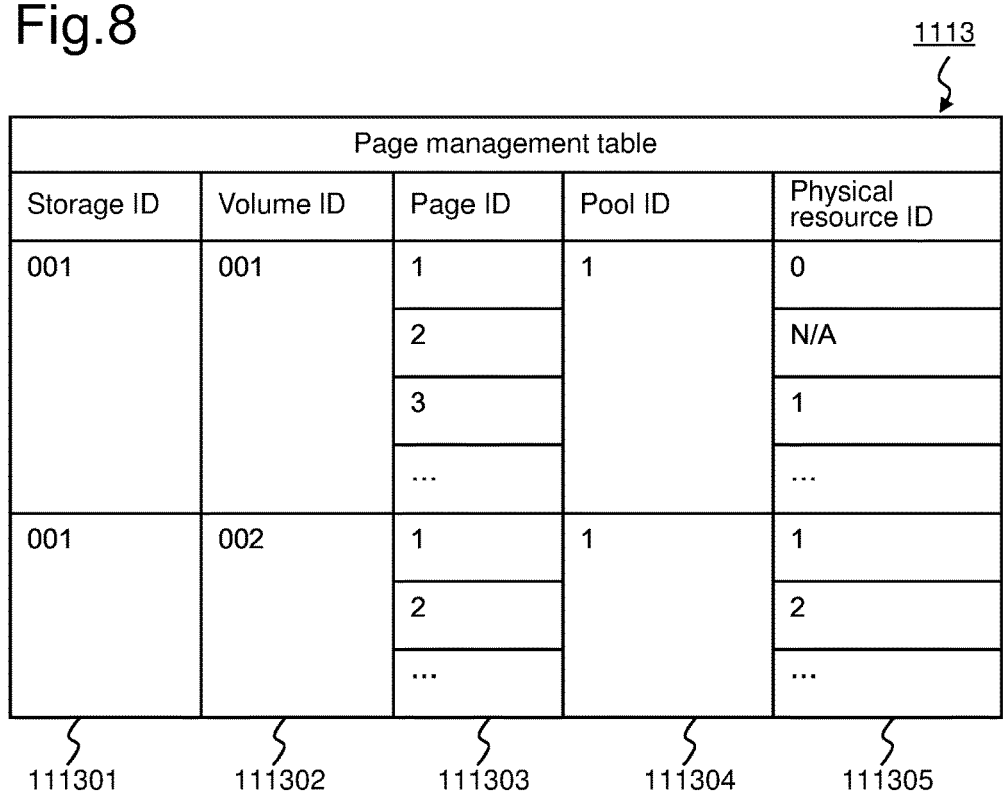
FIG. 8 is an example of a table managing the relationship between volumes and physical resources.

FIG. 8 is a table showing the contents of the page management table 1113 stored in the storage resource 110 of the management computer 100. The page management table 1113 stores information on pages which are allocation units of storage areas (areas in the physical storage area 380) with respect to the logical address spaces of the logical unit 390, and the correspondence between the pool 375 and physical resource 380 allocated to the page. As shown in FIG. 8, the page management table 1113 includes a storage ID 111301, a volume ID 111302, a page ID 111303, a pool ID 111304, and a physical resource ID 111305.

The storage ID 111301 is identification information of the storage subsystem 300 including the logical unit 390 whose information is stored in the relevant record.

The volume ID 111302 is identification information of the logical unit 390 whose information is stored in the relevant record.

The page ID 111303 is a number representing the location of the page within the logical address space of the logical unit 390.

The pool ID 111304 is identification information of the pool 375 to which the physical resource 380 allocated to the page of the logical unit 390 belongs.

The physical resource ID 111305 is identification information of the physical resource 380 allocated to the page of the logical unit 390. Further, in addition to the identification information of the physical resource 380, information (such as LBA) for specifying the area of the physical resource allocated to the page can be included in the physical resource ID 111305. Moreover, if the logical unit 390 is a thin-provisioning logical unit and an area of the physical resource 380 is not yet allocated to the page, value "N/A" is set.

The management computer 100 communicates with the storage subsystem 300 and updates the information stored in the page management table 1113 either periodically or if an operation (instruction) to acquire information is received from the user.

Figure 9:
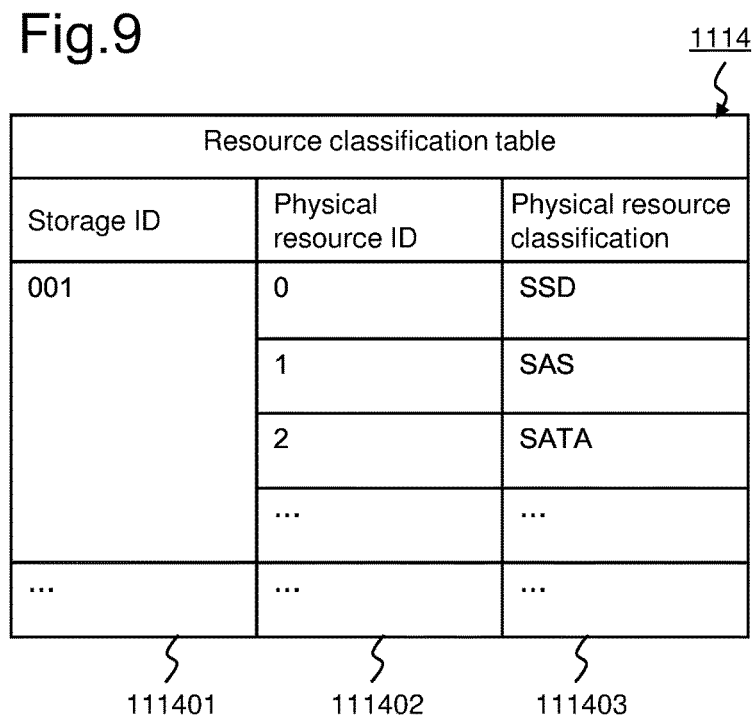
FIG. 9 is an example of a table managing the types of physical resource.

FIG. 9 is a table showing the contents of the resource classification table 1114 stored in the storage resource 110 of the management computer 100. The resource classification table 1114 stores the information of the physical resource 380 constituting the pool 375 and the information of the types of the storage media constituting the physical resource 380. As illustrated in FIG. 9, the resource classification table 1114 includes information of a storage ID 111401, a physical resource ID 111402, and a physical resource classification 111403.

The storage ID 111401 is identification information of the storage subsystem 300.

The physical resource ID 111402 is identification information of the physical resource 380.

The physical resource classification 111403 is information showing the type of the storage media configuring the physical resource 380.

The management computer 100 communicates with the storage subsystem 300 and updates information stored in the resource classification table 1114 either periodically or when an operation (instruction) to acquire information is received from the user.

FIG. 10 is a table indicating the contents of the storage-to-host connection management table 1115 stored in the storage resource 110 of the management computer 100. The storage-to-host connection management table 1115 is a table indicating the configuration information of a path for accessing the logical unit 390 from the host computer 100, and includes, as shown in FIG. 10, the information of a host ID 111501, a storage ID 111502, a storage port ID 111503, and a volume ID 111504.

The host ID 111501 is identification information of the host computer 100.

The storage ID 111502 is identification information of the storage subsystem 300.

The storage port ID 111503 is identification information of the C-I/F 340 to which the host computer 200 is physically connected. In FIG. 10, an embodiment is illustrated where a WWN (World Wide Name) is stored in the storage port ID 111503 as an example of using the HBA as the C-I/F 340.

The volume ID 111504 is identification information of the logical unit 390.

The management computer 100 communicates with the storage subsystem 300 and updates information stored in the storage-to-host connection management table 1115 either periodically or if an operation (instruction) to acquire information is received from the user.

FIG. 11 is a table showing the contents of the I/O amount management table 1121 stored in the storage resource 110 of the management computer 100. The I/O amount management table 1121 is a table storing information of the amount of I/O performed with respect to the logical unit 390. By referring to the I/O amount management table 1121, the statistical information of the amount of I/O performed with respect to the logical unit 390 can be recognized in page units. For example, as illustrated in FIG. 11, the I/O amount management table 1121 stores information on a storage ID 112101, a volume ID 112102, a page ID 112103, and an average I/O data amount per second 112104.

The storage ID 112101 is identification information of the storage subsystem 300.

The volume ID 112102 is identification information of the logical unit 390.

The page ID 112103 is a number indicating the location of the page in the logical address space of the logical unit 390.

The average I/O data amount per second 112104 is a statistical information indicating an arithmetic mean of the total I/O data amount per unit time performed within a fixed period of time (such as 10 minutes) before acquisition of information of the I/O data amount with respect to the page designated by the page ID 112103 of the relevant record, wherein the unit is set to one second.

The storage subsystem 300 monitors the I/O data amount per unit time of each page. The management computer 100 communicates with the storage subsystem 300 to update the information stored in the I/O amount management table 1121 either periodically or if an operation (instruction) to acquire information is received from the user.

FIG. 12 is a table showing the contents of the resource I/O performance table 1122 stored in the storage resource 110 of the management computer 100. The resource I/O performance table 1122 is a table storing the performance information of the physical storage media being the real body of the physical resources 380 in each resource type. As shown in FIG. 12, the resource I/O performance table 1122 includes information of a resource classification 112201, an amount of I/O data per unit time 112202, and a response time 112203.

The resource classification 112201 shows a type of the physical storage media serving as the real body of the physical resource 380.

The amount of I/O data per unit time 112202 shows the information on the amount of I/O data issued to a physical storage media within a unit time (such as one second).

The response time 112203 shows an I/O response time (required time from when an issue source of the I/O request to the physical resource 380 such as the controller 310 issues an I/O request to the physical resource to when a response is received) if an amount of I/O shown in 112202 is issued within the unit time to the physical storage media of the type shown in the resource classification 112201. Information such as a spec disclosed on a catalogue or a value measured in the storage subsystem 300 can be used as the value of response time 112203.

FIG. 13 is a table showing the contents of the network performance management table 1123 stored in the storage resource 110 of the management computer 100. The network performance management table 1123 is a table showing the performance information of a network when communication is performed between the host computers 200 and storage subsystems 300. For example, as illustrated in FIG. 13, the network performance management table 1123 includes information of a host ID 112301, a storage ID 112302, a storage port ID 112303 and an RTT 112304.

The host ID 112301 is identification information of the host computer 200.

The storage ID 112302 is identification information of the storage subsystem 300.

The storage port ID 112303 is identification information of the C-I/F 340 to which the host computer 200 is physically connected. In the present embodiment, a WWN (World Wide Name) is illustrated as an example of the HBA being used as the C-I/F 340.

The RTT 112304 is an RTT (Round-Trip Time) of the communication network in a case where the host computer 200 communicates with the C-I/F 340. This value can be acquired such as via a method of measuring the response time by the host computer 200 and periodically collecting the information by the management computer 100.

For example, the management computer 100 communicates with the host computer 200 and acquires the information held in the network performance management table 1123 either periodically or if an operation (instruction) to acquire information is received from the user.

Figure 14:
FIG. 14 is an example of a table managing paths used when the host computer accesses the storage.

FIG. 14 is a table showing the contents of the volume access path management table 1131 stored in the storage resource 110 of the management computer 100. The volume access path management table 1131 is a table showing the status information of the path from the host computer 200 to the logical unit 390. As shown in FIG. 14, the volume access path management table 1131 includes information of a host ID 113101, a storage ID 113102, a volume ID 113103, a storage port ID 113104, and a status 113105.

The host ID 113101 is identification information of the host computer 200.

The storage ID 113102 is identification information of the storage subsystem 300 including the logical unit 390 or the virtual storage subsystem 500 including the virtual logical unit 510 to which the host computer 200 accesses.

The volume ID 113103 is identification information of the logical unit 390 or the virtual logical unit 510 to which the host computer 200 accesses.

The storage port ID 113104 is identification information of the C-I/F 340 of the storage subsystem 300 or the identification information of the C-I/F 520 of the virtual storage subsystem 500 which the host computer 200 uses when accessing the logical unit 390. In the example of FIG. 14, two IDs ("11.11.11.11.11.11.11.11" and "22.22.22.22.22.22.22.22") are stored in the storage port ID 113104 of the row (record) where (the host ID 113101, the storage ID 113102, the volume ID 113103) are (HV1, 100, 101), respectively. Hereafter, in order to prevent the description from becoming lengthy, the storage port whose ID is "11.11.11.11.11.11.11.11" is called "port 1" and the storage port whose ID is "22.22.22.22.22.22.22.22" is called "port 2".

In the example of FIG. 14, the host computer 200 whose host ID is HV1 can access the volume (volume whose volume ID is 101; in the present embodiment, this is the virtual logical unit 510) using the route (access path) passing the port 1, or it can access the volume using the route passing the port 2 (there are two access paths from the host computer 200 to the virtual logical unit 510, and they are both in an available state).

According to the computer system of the present embodiment, the same identification information as the C-I/F 340 of the storage subsystem 300 is used as the identification information of C-I/F 520 of the virtual storage subsystem 500. This will be described with reference to FIG. 4. In the configuration example of FIG. 4, an access path passing the C-I/F 340 (*a*) exists as the access path from the host computer 200 to the logical unit 390 (*a*), and an access path passing the C-I/F 340 (*b*) exists as the access path from the host computer 200 to the logical unit 390 (*b*). The storage subsystems 300 (*a*) and 300 (*b*) further make it appear as if there are two access paths from the host computer 200 to the virtual logical unit 510, one access path passing C-I/F 520 (*a*) and another access path passing C-I/F 520 (*b*). In this configuration, the identification information of the C-I/F 340 (*a*) is the same as the identification information of the C-I/F 520 (*a*), and the identification information of the C-I/F 340 (*b*) is the same as the identification information of the C-I/F 520 (*b*).

The status 113105 is information on a state of a path used for the access from the host computer 200 designated by the host ID 113101 to the logical unit 390 or the virtual logical unit 510 designated by the volume ID 113103. Any value selected from "Unavailable", "Primary" and "Secondary" is set as the status 113105. "Unavailable" shows that the path is in an unavailable state. "Primary" shows that the access time of the path to the logical unit 390 or the virtual logical unit 510 is relatively short compared to other paths, so that the path should be used with priority. "Secondary" shows that the access time of the path to the logical unit 390 or the virtual logical unit 510 is relatively long compared to other paths, so that it should not be used with priority.

If there are a plurality of access paths to the logical unit 390 (or the virtual logical unit 510), the storage subsystem 300 can notify the path to be used with priority to the host computer 200. This notice can be performed according to an ALUA (Asymmetric Logical Unit Access) standardized via a specification of SCSI Primary Commands-3, for example. If two or more paths are in an available state, for example, the storage subsystem 300 can notify the host computer 200 to use a specific single path with priority. In that case, the management computer 100 sets "Primary" as the status 113105 of the path notified to be used with priority, and sets "Secondary" as the status 113105 of the other available paths.

If it is detected that a path from the logical unit 390 to the host computer 200 has been added to the storage subsystem 300, if it is detected that the setting of the host computer 200 has been changed, or periodically, the management computer 100 communicates with the host computer 200, and acquires a path setting information (not shown) stored in the host computer 200. The path setting information includes whether to use the priority information of the path or not.

If the host computer 200 uses the priority information of the path notified from the storage subsystem 300, the management computer 100 sets the priority information ("Primary" or "Secondary") of the path acquired from the storage subsystem 300 to the status 113105 of the available path. If the host computer 200 does not use the priority information of the paths, "Primary" information is set to all available paths.

The management computer 100 creates the volume access path management table 1131 from the priority use information of the path acquired as above from the host computer 200, and the storage-to-host connection management table 1115 acquired from the storage subsystem 300. Further, if the information of the access path from the host computer 200 to the virtual logical unit 510 is registered in the volume access path management table 1131, the information of the access path between the logical unit 390 mapped to the virtual logical unit 510 and the host computer 200 will not be registered.

Figure 15:
FIG. 15 is an example of a table managing the relationship between volumes and VMs.

FIG. 15 is a table showing the contents of the VM volume correspondence management table 1132 stored in the storage resource 110 of the management computer 100. The VM volume correspondence management table 1132 is a table showing the information of the logical unit 390 or the virtual logical unit 510 used by the VM 2001 (in other words, the logical unit 390 or the virtual logical unit 510 storing the disk image of the VM 2001). As shown in FIG. 15, the VM volume correspondence management table 1132 includes information of a VM ID 113201, a storage ID 113202, and a volume ID 113203. The present embodiment illustrates an embodiment where each of the VMs 2001 uses one logical unit 390 (or virtual logical unit 510), without the multiple VMs 2001 storing disk images in one logical unit 390 (or virtual logical unit 510). However, a configuration can be adopted where the plurality of VMs 2001 store disk images in one logical unit 390 (or virtual logical unit 510).

The VM ID 113201 is identification information of the VM 2001.

The storage ID 113202 is identification number of the storage subsystem 300 having the logical unit 390 in which the disk image of the VM 2001 is stored, or an identification number of the virtual storage subsystem 500 having the virtual logical unit 510 in which the disk image of the VM 2001 is stored.

The volume ID 113203 is identification number of the logical unit 390 or the virtual logical unit 510 in which the disk image of the VM 2001 is stored.

For example, the management computer 100 communicates with the host computer 200 either periodically or if an operation (instruction) to acquire information is received from the user, acquires the information of a pair of the VM 2001 and the logical unit 390 (or virtual logical unit 510) in which the disk image of the VM 2001 is stored, and stores the same in the VM volume correspondence management table 1132. In the following description, the logical unit 390 (or the virtual logical unit 510) in which the disk image of a certain VM 2001 is stored is also referred to as "logical unit 390 (or virtual logical unit 510) corresponding to the VM 2001". When the disk image of a VM 2001 is stored in a certain logical unit 390 (or virtual logical unit 510), the VM 2001 may be referred to as "the VM 2001 corresponding to the logical unit 390 (or virtual logical unit 510)".

Figure 16:
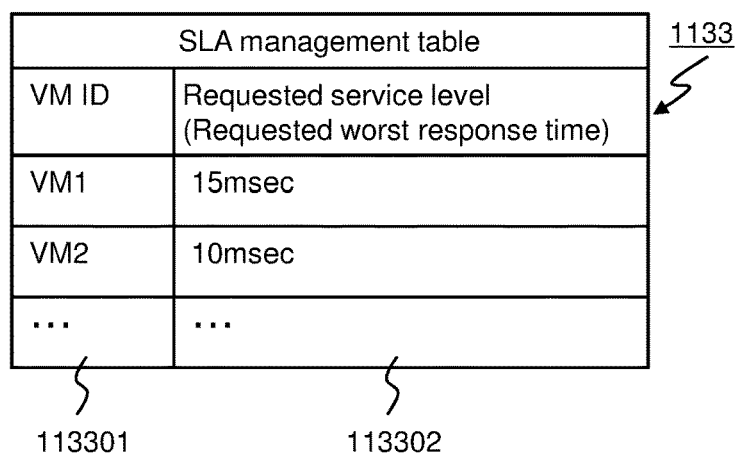
FIG. 16 is an example of a table managing a service level of VMs.

FIG. 16 is a table showing the contents of the SLA management table 1133 stored in the storage resource 110 of the management computer 100. The SLA management table 1133 is a table managing SLA (Service Level Agreement) information that is set in each VM 2001. As shown in FIG. 16, for example, the SLA management table 1133 includes a VM ID 113301 and a requested service level 113302.

The VM ID 113301 is identification information of the VM 2001.

A worst value of service level requested in the VM 2001 is registered in the requested service level 113302. FIG. 16 illustrates an example in which a response time (I/O response time with respect to logical unit) is used as a metrics of SLA. Therefore, in the requested service level (requested worst response time) 113302, the worst value (maximum value) of I/O response time with respect to the logical unit 390 (or the virtual logical unit 510) requested in the VM 2001 is registered.

The response time is one example of the metrics of SLA, and for example, metrics indicating the performance information such as MB/s, or metrics indicating other performances such as RTO (recovery time objective), can be managed in the SLA management table 1133.

In principle, each VM 2001 is required that the service level that can be provided to the user or the application program is equal to or greater than the requested service level 113302. When response time (I/O response time with respect to the logical unit) is used as the metrics of SLA, the I/O response time with respect to the logical unit 390 (or the virtual logical unit 510) of each VM 2001 is required to be equal to or smaller than the value registered in the requested service level (requested worst response time) 113302. The same applies to a case where the environment (configuration) of the computer system is changed, such as when the configuration of the storage subsystem 300 is changed.

For example, the management computer 100 acquires information to be stored in the SLA management table 1133 by communicating with the host computer 200 either periodically or if an operation (instruction) to acquire information is received from the user, or by storing values entered by the user, and stores the information in the SLA management table 1133.

Figure 17:
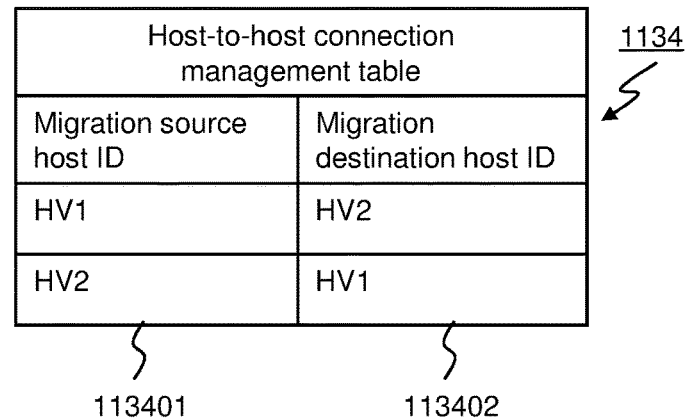
FIG. 17 is an example of a table managing a connection relationship between host computers.

FIG. 17 is a table showing the contents of the host-to-host connection management table 1134 stored in the storage resource 110 of the management computer 100. The host-to-host connection management table 1134 is a table showing the information of combination of host computers connected via the first communication network 410. As mentioned earlier, one of the conditions for migrating the VM 2001 between two host computers 200 is that the two host computers 200 are connected via the first communication network 410. Therefore, it can be stated that information of the host computers 200 that may be a candidate of migration destination of the VM 2001 is stored in the host-to-host connection management table 1134.

As shown in FIG. 17, the host-to-host connection management table 1134 includes information of a migration source host ID 113401 and a migration destination host ID 113402. The migration source host ID 113401 is identification information of the host computer 200 in which the VM 2001 is operating and also being the migration source of the VM 2001.

The migration destination host ID 113402 is identification information of the host computer 200 capable of migrating the VM 2001 operating in the migration source host ID 113401.

For example, the management computer 100 acquires information of the connection information between host computers by communicating with the host computer 200 either periodically or when an operation (instruction) to acquire information is received from the user, or by retaining values entered from the user, and stores the information in the host-to-host connection management table 1134.

Figure 18:
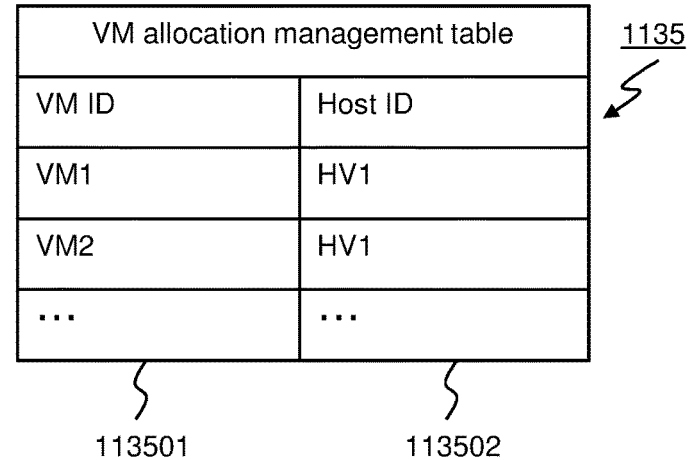
FIG. 18 is an example of a table managing a relationship between host computers and VMs.

FIG. 18 is a table showing the contents of the VM allocation management table 1135 stored in the storage resource 110 of the management computer 100. The VM allocation management table 1135 is a table showing the combination of the VM 2001 and the host computer 200 in which the VM 2001 is operating. As shown in FIG. 18, the VM allocation management table 1135 includes information of a VMID 113501 and a host ID 113502.

The VMID 113501 is identification information of the VM 2001.

The host ID 113502 is identification information of the host computer 200 in which the VM 2001 is operating.

For example, the management computer 100 acquires the information of the VM 2001 operating on the host computer 200 by communicating with the host computer 200 either periodically or when an operation (instruction) to acquire information is received from the user, or by retaining values entered from the user, and updates the information of the VM allocation management table 1135.

(1-4) Details of Operation of Each Apparatuses

Figure 19:
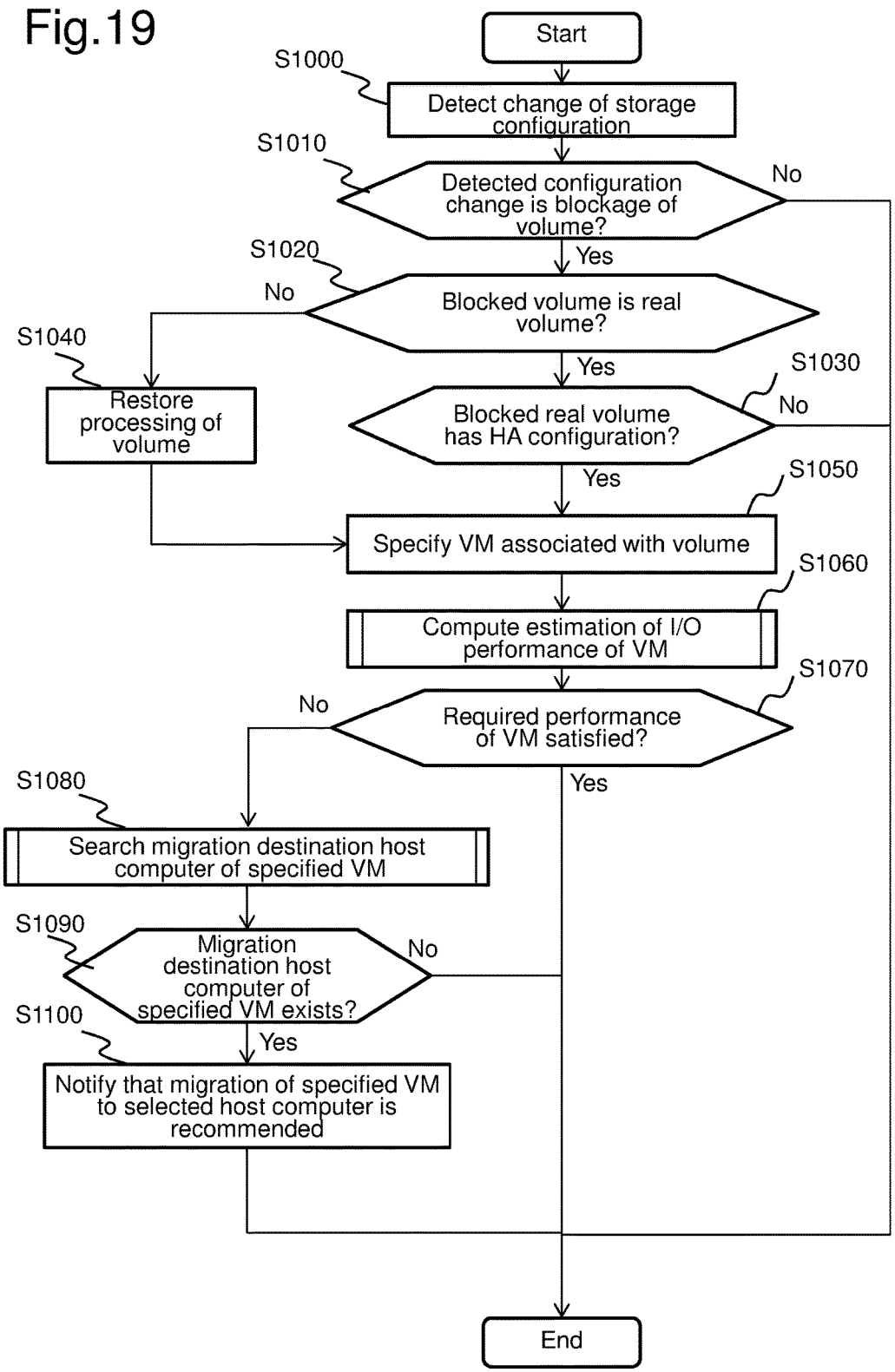
FIG. 19 is a flowchart illustrating a process for generating host-to-host migration plan of the VM according to first embodiment.
Figure 20:
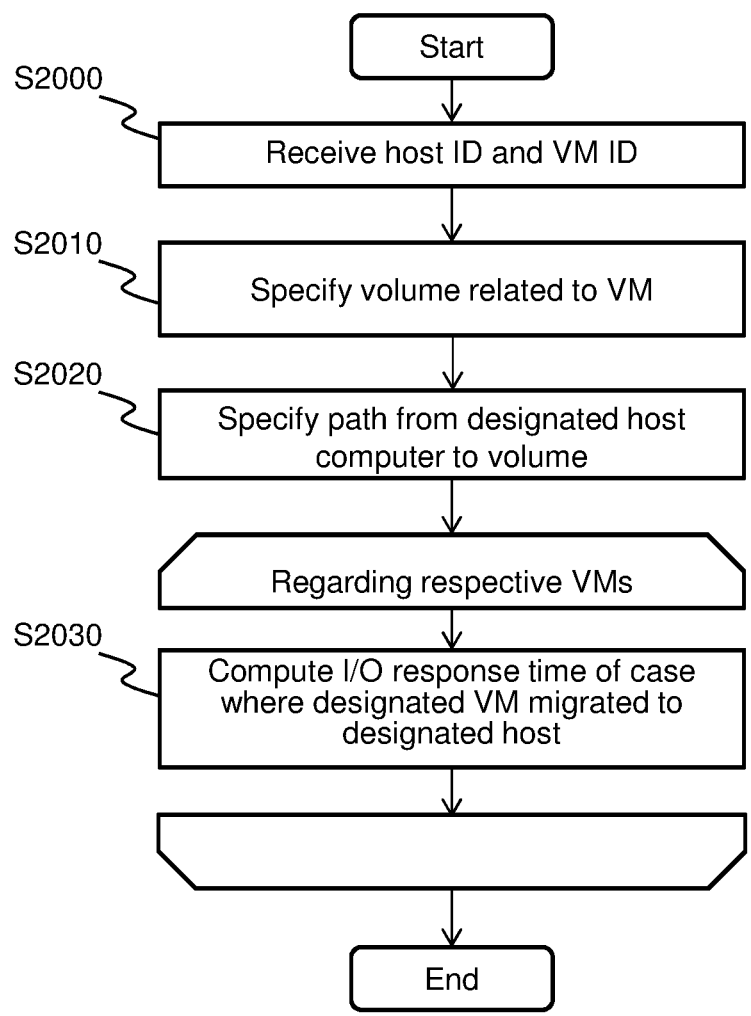
FIG. 20 is a flowchart illustrating a process for estimating influence if the VM is migrated from one host computer to another.
Figure 21:
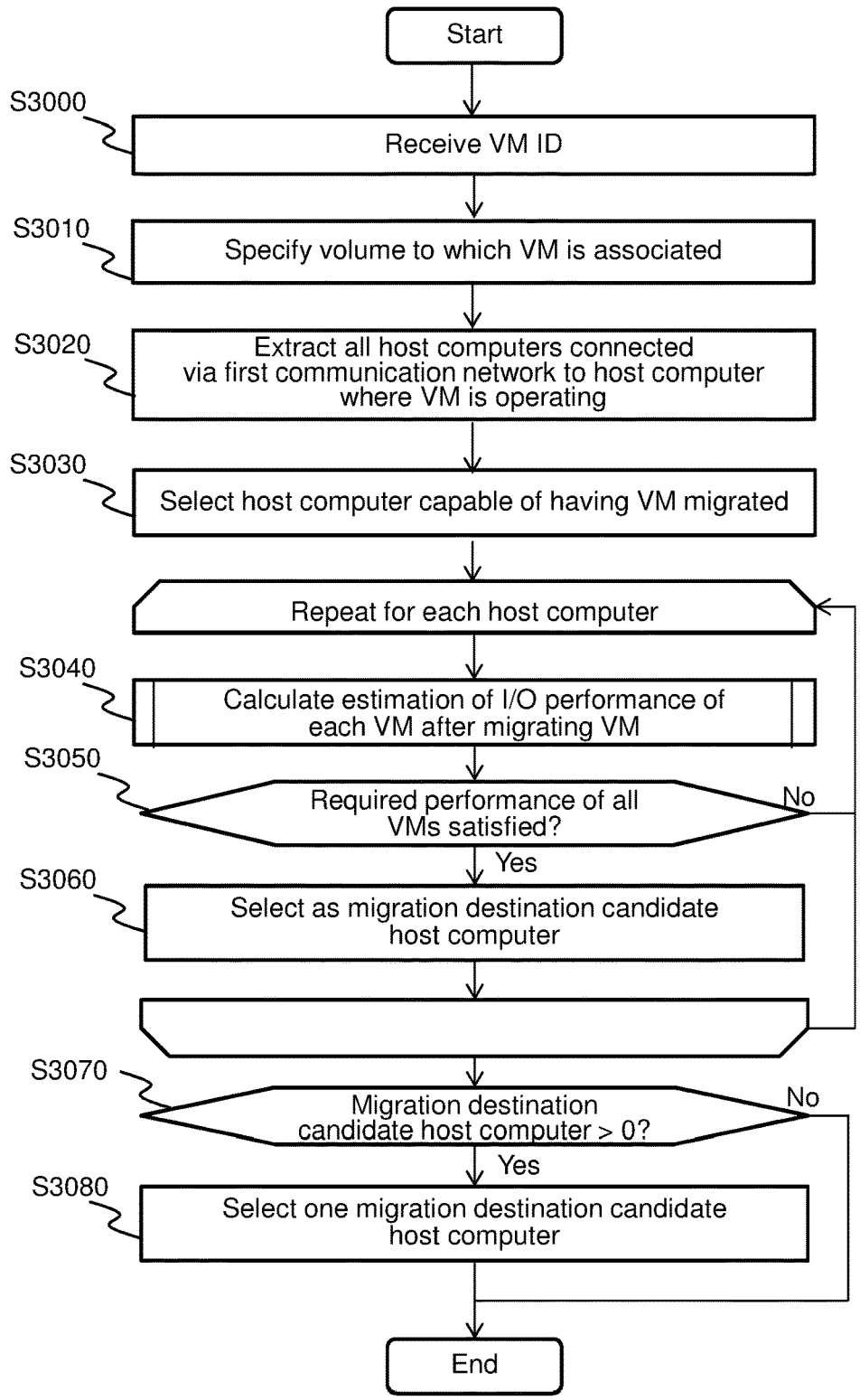
FIG. 21 is a flowchart illustrating a process for specifying a host computer being the migration destination of VM according to first and second embodiments.

The details of a VM migration plan generation processing, which is a process that the management computer 100 performs to specify an appropriate migration destination host computer 200 of the VM 2001 if the configuration of the storage subsystem 300 has been changed, will be described with reference to the flowcharts of FIGS. 19, 20 and 21. FIG. 19 is a VM migration plan generation program 1101 illustrating the overall VM migration plan generation processing. FIG. 20 is the VM I/O performance estimation program 1102, which is a subprogram called by the VM migration plan generation program. FIG. 21 is the VM migration destination host computer search program 1103, which is a subprogram called by VM migration plan generation program.

The processing of the VM migration plan generation program 1101 will be described with reference to FIG. 19. Hereafter, the VM migration plan generation program 1101 is set as the subject of operation in the description.

The VM migration plan generation program 1101 monitors the change in the table retaining the configuration information of the storage subsystem 300, such as the volume configuration information table 1111 or the HA configuration management table 1112, and detects the change of configuration of the storage subsystem 300 (S1000).

The trigger for activating the VM migration plan generation program 1101 can be either an automatic execution at predetermined intervals, or when the configuration change of the storage subsystem 300 or the virtual storage subsystem 500 is instructed to the management computer 100 and the management computer 100 performs a configuration change processing. It can also be the timing in which information of failure that has occurred in the storage subsystem 300 or information of the configuration change has been notified from the storage subsystem 300, the host computer 200 or other management computers 100.

As the method for detecting the contents of configuration change of the storage subsystem 300 in S1000, information notified from the storage subsystem 300, the host computer 200, the other management computers 100, or the input/output device 130 provided in the management computer 100 can be used. In that case, the management computer 100 updates various information stored in the storage resource 110 by means for acquiring configuration information from the storage subsystem 300 and so on, and performs the processes of S1010 and thereafter.

Next, the VM migration plan generation program 1101 judges whether the detected contents of the configuration change of the storage subsystem 300 is a configuration change in which the paths from the host computer 200 to the logical unit 390 or the virtual logical unit 510 are reduced. In the present embodiment, as one example, in S1010, by referring to the blocked state 111106 of the volume configuration information table 1111, whether the logical unit 390 or the virtual logical unit 510 turned to the blocked state or not is determined.

If the result of S1010 is negative, and the number of paths has increased or has not changed, it is determined that the configuration change that has occurred to the storage subsystem 300 does not influence the VM 2001, and the process is ended. In this specification, the influence on the VM 2001 is the change (deterioration) of service level that the VM 2001 can provide. The present embodiment assumes the response time as one example thereof in the following description.

If the result of S1010 is positive, the VM migration plan generation program 1101 further refers to the volume configuration information table 1111, and judges whether the target that could not be used from the host computer 200 is the logical unit 390 or not (S1020).

If the result of S1020 is negative, the target that could not be used from the host computer 200 is the virtual logical unit 510. In that case, since the host computer 200 is not conscious of the real body of the virtual logical unit 510, it restores the backup data of the blocked logical unit 390 from the backup device (not shown), for example, to other logical units 390, and adds the identification information of the virtual logical unit 510 to the restore destination logical unit 390, to make it appear to the host computer 200 as if the virtual logical unit 510 has become temporarily available (S1040).

At this time, the storage subsystem 300 being the restore destination can be the same storage subsystem 300 having the logical unit 390 that has become inaccessible, or can be different. The viewpoint of selection is, for example, to have a physical resource 390 satisfying the service level defined in the VM 2001, or to have the provided function.

Furthermore, the virtual logical unit 390 that has become unavailable from the host computer 200 may adopt an HA configuration. In that case, if data is restored at least in one logical unit 390, I/O can be continued. However, if data is restored only in one logical unit 390, the availability that can be ensured is changed. Therefore, whether to set the HA configuration to the restore target logical unit 390 or not, or if setting the configuration, the number or arrangement of logical units 390 constituting the HA configuration and the timing for setting the HA configuration, must be determined. In that case, the determination should preferably be based on the service level defined in the VM 2001, or the physical resources 390 or functions of the available storage subsystem 300.

If the result of S1020 is positive, the VM migration plan generation program 1101 refers to the volume configuration information table 1111 and the HA configuration management table 1112, and further judges whether the HA configuration is set to the blocked logical unit 390 or not (S1030). If the HA configuration is set, when the logical unit 390 is blocked, the alternate path program 2003 of the host computer 200 recognizes that one of the access paths to the virtual logical unit 510 has become unavailable (that the number of access paths decreased). Therefore, if the result of S1030 was positive (S1030: Yes), the host computer 200 switched the path being used, and became a state where the host computer 200 accesses a different logical unit 390 mapped to the virtual logical unit 510.

On the other hand, if the HA configuration is not set (S1030: No), the logical unit 390 that has become unavailable from the host computer 200 is in a non-virtualized state. In that case, it is necessary to either recover the failure that has caused the blockage, or to restore data to an alternative logical unit 390. Therefore, if the blocked logical unit 390 does not have an HA configuration, the VM migration plan generation program 1101 outputs a notice to the input/output device 130 and the like notifying that the logical unit 390 has become unavailable, and ends the process.

Next, the VM migration plan generation program 1101 executes S1050. S1050 is executed in a state where the host computer 200 cannot access one of the logical units 390 mapped to the virtual logical unit 510, and the path from the host computer 200 to a certain logical unit 390 mapped to the virtual logical unit 510 is changed to a path to a different logical unit 390. Therefore, in order to recognize the influence to the VM 2001 by the switching of the path used by the host computer 200, the VM migration plan generation program 1101 first refers to the VM volume correspondence management table 1132, and specifies the VM 2001 corresponding to the virtual logical unit 510 (the virtual logical unit 510 having one of the corresponding logical units 390 blocked).

Next, the VM migration plan generation program 1101 judges whether the change of state (configuration state) of the storage subsystem 300 has influenced the respective VMs 2001 operating in the host computer 200 or not (S1060). Specifically, it judges whether the change of state of the storage subsystem 200 has influenced the VM 2001 or not by computing (estimating) the service level that each VM 2001 operating in the host computer 200 can provide at the current point of time (at the point of time when S1060 is executed; in other words, the point of time when the configuration of the storage subsystem 300 has changed). In the present embodiment, as an example of service levels, a case is illustrated where the response time of the VM 2001 is estimated. The actual method of estimating the response time will be described when the contents of processing of the VM I/O performance estimation program 1102 described below are explained. In S1060, the VM migration plan generation program 1101 calls the VM I/O performance estimation program 1102. In calling the program, the VM migration plan generation program 1101 passes the identification information of the VM 2001 specified in S1050 and the identification information of the host computer 200 in which the VM 2001 is operating as arguments to the VM I/O performance estimation program 1102. In S1060, as a result of the VM migration plan generation program 1101 calling the VM I/O performance estimation program 1102, the VM migration plan generation program 1101 receives the service level (response time) that each VM 2001 operating in the host computer 200 designated by the argument is capable of providing from the VM I/O performance estimation program 1102.

The VM migration plan generation program 1101 compares the result of S1060 and the contents of the SLA management table 1133, and judges whether each VM 2001 operating in the host computer 200 fulfils the required service level or not (S1070). For example, if the result of S1060 is greater than the requested service level (requested worst response time) 113302, it is determined that the service level of the relevant VM is not satisfied.

If the result of S1070 is positive, the path to the virtual logical unit 510 after switching the path used by the host computer 200 still satisfies the service level set to the VM 2001, so the VM migration plan generation program 1101 ends normally.

If the result of S1070 is negative, the VM migration plan generation program 1101 searches for a migration destination host computer 200 capable of satisfying the service level required in the VM 2001 (S1080). In S1080, the VM migration plan generation program 1101 searches for a host computer 200 capable of satisfying the requested service level (requested service level 113302 managed by the SLA management table 1133) of the VM 2001 (this is called a "migration destination host computer 200") by calling the VM migration destination host computer search program 1103. When the VM migration destination host computer search program 1103 is called, the VM migration plan generation program 1101 passes the identification information of the VM 2001 being the migration target as an argument to the VM migration destination host computer search program 1103. The VM migration destination host computer search program 1103 is a program for detecting the host computer 200 appropriate for migrating the VM 2001 designated by the argument (host computer 200 capable of satisfying the service level required to the VM 2001), and returns the information of the detected host computer 200 to the call source program. However, if there is no appropriate host computer 200, a response is returned stating that a host computer 200 appropriate as the migration destination of the VM 2001 has not been found. The details of the processing performed by the VM migration destination host computer search program 1103 will be described later.

Next, the VM migration plan generation program 1101 judges, based on the result of S1080, whether an appropriate migration destination host computer 200 satisfying the requested service level of the VM 2001 has been found or not (S1090).

If the result of S1090 is positive, the VM migration plan generation program 1101 outputs a statement that migration of the VM 2001 is recommended to fulfil the requested service level of the VM 2001 and the information of the host computer 200 specified as the migration destination of the VM 2001 in S1080 to the input/output device 130, and ends the processing (S1100). On the other hand, if the result of S1090 is negative, the VM migration plan generation program 1101 outputs a statement that there is no host computer 200 satisfying the requested service level of the VM 2001 to the input/output device 130, and ends the processing.

Next, the details of the VM I/O performance estimation program 1102 will be described with reference to FIG. 20. The VM I/O performance estimation program 1102 is a program for estimating the I/O performance of the designated VM 2001 and of other VMs 2001 operating on the designated host computer 200 in a case where the designated VM 2001 is operated on a designated host computer 200. In the present embodiment, an example is illustrated where the response time is estimated as the I/O performance.

The VM I/O performance estimation program 1102 receives the identification information of the VM 2001 and the identification information of the host computer 200 as arguments (input information) from the call source program (such as the VM migration plan generation program 1101) (S2000). In the following, this VM 2001 designated by the argument is referred to as "target VM", and the host computer 200 designated by the argument is referred to as "target host". The VM I/O performance estimation program 1102 performs estimation of I/O performance of each VM 2001 (including the target VM) operating on the target host when the target VM is migrated to the target host.

At first, the VM I/O performance estimation program 1102 specifies the virtual logical unit 510 or the logical unit 390 storing the disk image of the target VM, and the virtual logical unit 510 or the logical unit 390 storing the disk image of each VMs 2001 operating in the target host using the information of the VM volume correspondence management table 1132 (S2010). If the volume storing the disk image of the VM 2001 is the virtual logical unit 510, the virtual logical unit 510 will be specified.

Next, the VM I/O performance estimation program 1102 specifies the path that the target host can use for accessing the virtual logical unit 510 or the logical unit 390 specified in S2010 (S2020). The method for specifying the path can be, for example, referring to the volume access path management table 1131 and specifying the path that the target host can use for accessing the virtual logical unit 510 or the logical unit 390 specified in S2010. At this time, if there is a path whose status 113105 is set to "Primary" in the volume access path management table 1131, the path whose status 113105 is set to "Primary" is selected, and if there is no such path, the path set to "Secondary" is selected. This is because the host computer 200 selects the path to be used (using the path whose status 113105 is set to "Primary" with priority) according to the status information of the paths notified from the storage subsystem 300.

The method for selecting the path is not restricted to the method for referring to the volume access path management table 1131. For example, if the host computer 200 in which the target VM is operating and the target host are the same, the management computer 100 can acquire the information of the path used for accessing the virtual logical unit 510 or the logical unit 390 from the host computer 200.

Next, the VM I/O performance estimation program 1102 simulates the change of status of the target VM and each VM 2001 operating on the target host in a case where the target VM is migrated to the target host (S2030). In the present embodiment, specifically, the I/O response time of each VM in a state where the target VM has been migrated to the target host is estimated. The example of the method for estimating the I/O response time will be described below. The I/O response time of the VM is the time from when the VM (host computer 200) issues an I/O request to the logical unit 390 to the time when the storage subsystem 300 returns a response to the VM. This time can be calculated from the sum of the RTT of the network 420 (hereinafter referred to as "network latency") between the host computer 200 on which the VM 2001 operates and the storage subsystem 300 and the latency occurring within the storage subsystem 300 (referred to as the response time of the logical unit 390). At first, we will describe the method for calculating (estimating) the latter response time of the logical unit 390.

The response time of the logical unit 390 can be estimated by performing (a1) through (a5) described below, for example.

(a1) The VM I/O performance estimation program 1102 specifies the logical unit 390 to which the target VM is currently performing data access (the logical unit 390 that the target VM accesses when it is not yet migrated to the target host), and specifies the I/O amount issued to the specified logical unit 390. Hereinafter, the logical unit 390 to which the target VM is currently performing data access is referred to as a "pre-migration LU".

Actually, the specification is performed in accordance with the following flow. The VM I/O performance estimation program 1102 refers to the VM allocation management table 1135 to specify the host computer 200 in which the target VM is currently executed, and further uses the information of the volume access path management table 1131 and the volume configuration information table 1111 to specify the pre-migration LU. If the volume to which the target VM is performing data access is the virtual logical unit 510, the pre-migration LU is specified by referring to the storage-to-host connection management table 1115 and the volume access path management table 1131. Specifically, the logical unit 390 connected to the path whose status 113105 of the volume access path management table 1131 is set to "Primary" is specified using the information of the storage-to-host connection management table 1115.

Next, it refers to the I/O amount management table 1121, and specifies the statistics of the I/O amount performed by the target VM to each page of the pre-migration LU (the average I/O data amount per second 112104) for each page.

(a2) Next, the VM I/O performance estimation program 1102 specifies the logical unit 390 to which the target VM performs data access assuming that the target VM has been migrated to the target host. It can be specified by referring to the storage-to-host connection management table 1115 and the volume access path management table 1131 based on the information of the logical unit 390 specified in S2010 and the information of the path specified in S2020. In the following, the logical unit 390 which will be accessed assuming that the target VM has migrated to the target host is called a "post-migration LU".

(a3) Next, the data I/O amount to be issued to the post-migration LU when assuming that the target VM has migrated to the target host is estimated based on the information on the statistic of the I/O amount specified in (a1) (statistic of the I/O amount that the target VM has issued to the pre-migration LU) and the information on the statistic of the I/O amount of the post-migration LU stored in the I/O amount management table 1121. If the I/O characteristics of the target VM is mainly read (with rarely any write), this process should be performed by setting the value having added the statistic of the I/O amount specified in (a1) to the data I/O amount of the post-migration LU stored in the I/O amount management table 1121 as the estimated value. Further, if the read ratio of the target VM (ratio of read with respect to all I/Os) is recognized to be R (0<R<1), estimation should be performed by adding (statistic of I/O amount specified in (a1)×R) to the data I/O amount per page of the post-migration LU stored in the I/O amount management table 1121. The estimation of data I/O amount performed here is performed in each page.

(a4) Next, in (a4), the response time of the I/O issued to the respective physical resources 380 after the target VM has been migrated to the target host is estimated. The estimation mainly uses the statistic (estimated value) of data I/O amount of each logical unit to each page after the target VM has been migrated to the target host, and the relationship between the amount of I/O data per unit time 112202 and the response time 112203 held in a resource performance table 1122. The outline of the estimation method will be described below.

The data I/O amount (estimated value) of each page of the post-migration LU after the target VM has been migrated to the target host is assumed to be the value specified in (a3). On the other hand, as for the data I/O amount of other logical units, the value should not be fluctuated since the VM 2001 accessing the logical unit is not migrated. Therefore, the information stored in the I/O amount management table 1121 should be adopted as the estimated value of the data I/O amount of each page of other logical units.

The VM I/O performance estimation program 1102 calculates the data I/O amount issued to the respective physical resources 380 by using the data I/O amount (estimated value) of each page of each logical unit after the target VM has been migrated to the target host, and the page management table 1113 (since the relationship between the respective physical resource and the pages to which the respective physical resources are mapped is managed by the page management table 1113, by calculating the sum of the data I/O amounts with respect to the pages to which the physical resources are mapped, the data I/O amount issued to the physical resources 380 can be calculated). Furthermore, it estimates the response time of I/O issued to the respective physical resources 380 by referring to the resource performance table 1122.

(a5) Next, the VM I/O performance estimation program 1102 specifies the logical unit 390 to which the respective VMs 2001 perform data access for each VM 2001 being the target of simulation of the change in the response time. If the VM 2001 being the target of simulation is the VM designated in S2000 (target VM), the logical unit 390 is the one specified in (a2), and in other cases, the unit is specified via a similar method as (a1). Furthermore, the page management table 1113 is referred to based on the information of the specified logical unit 390, and (one or more) physical resource(s) 380 to which the simulation target VM 2001 accesses is/are specified. Then, based on the information estimated in (a4), the response time of data I/O with respect to the respective physical resources 380 that the simulation target VM 2001 accesses is specified, and the maximum value of the response time of those physical resources 380 is selected. The maximum value of the response time selected here is determined as the estimated value of response time of the logical unit 390 to which the simulation target VM 2001 accesses.

As described above, in (a1), the logical unit 390 to which the target VM is currently (before being migrated to the target host) performing data access is specified. Further, the post-migration LU is specified in (a2). As a result of executing (a1) and (a2), there may be a case where the logical units 390 specified in (a1) and (a2) are the same. This is the case where the VM I/O performance estimation program 1102 has been called by the VM migration plan generation program 1101 (S1060). In this case, since the performance when the VM 2001 has been migrated is not estimated, the processes (a4') and (a5') described below are performed after (a2), instead of (a3), (a4) and (a5) described above, to estimate the response time of the logical unit 390 to which the respective VMs 2001 are currently accessing.

(a4') The VM I/O performance estimation program 1102 calculates the data I/O amount being issued to the respective physical resources 380 by referring to the statistics of the data I/O amounts of the respective pages held in the I/O amount management table 1121 and the information stored in the page management table 1113. In addition, by referring to the resource performance table 1122, it estimates the I/O response time issued to the respective physical resources 380.

(a5') Next, the VM I/O performance estimation program 1102 specifies the logical unit 390 to which the respective VMs 2001 perform data access for each VM 2001 being the target of simulation of the change in the response time. Further, it specifies the physical resource group that the simulation target VM 2001 access, using the information of the specified logical unit 390 and the information of the page management table 1113. Then, based on the information of (a4'), the response times of data I/O with respect to the respective physical resources 380 that the simulation target VMs 2001 access are specified, and a value having added the RTT of network 420 between the storage subsystems 300 and the host computers 200 to the maximum value of response time of the physical resources 380 is calculated as the response time of the simulation target VMs 2001.

As described, the response time of the logical units 390 to which the respective VMs 2001 access can be estimated. The value having added the network latency to the response time of the logical unit 390 is calculated as the I/O response time of the VM 2001. In order to estimate the network latency, the value stored in the RTT 112304 of the network performance management table 1123 is utilized. In other words, the value of the RTT 112304 corresponding to the host ID 112301 of the host computer 200 in which the simulation target VM 2001 operates and the storage ID 112302 of the storage subsystem 300 in which the logical unit 390 that the simulation target VM 2001 accesses is set as the estimated value of network latency.

By the above-described method, the VM I/O performance estimation program 1102 calculates the estimated value of the I/O response time of the designated VM 2001 and the VM 2001 operating in the designated host computer 200, and ends the processing. Further, information other than the RTT of the network or the response time of the physical resource 380 can be used to enhance the accuracy of estimation of response time. For example, the change of processing time by the status of load applied on the C-I/F 520 or the CPU 320 can also be used. Furthermore, the method for computing the estimation described above is merely one example of the method for computing the network RTT or the response time of the physical storage media, and the computing method is not restricted thereto. For example, methods such as measuring the data of the I/O amount and the tendency of change of the response time of the physical storage media can be adopted.

Next, the details of the VM migration destination host computer search program 1103 will be described with reference to FIG. 21. The VM migration destination host computer search program 1103 is a program for searching for an appropriate host computer 200 (that satisfies the requested service level of the VM 2001) when migrating the VM 2001 designated by the argument.

At first, the VM migration destination host computer search program 1103 receives the identification information of the migration target VM 2001 from the call source program as an argument (S3000). Hereafter, the VM 2001 specified by the argument received from the call source program is referred to as "target VM". Thereafter, the VM migration destination host computer search program 1103 refers to the identification information of the target VM and the information of the VM volume correspondence management table 1132 to specify the virtual logical unit 510 or the logical unit 390 in which the disk image of the target VM is stored (S3010).

Next, the VM migration destination host computer search program 1103 refers to the VM allocation management table 1135 to specify the host computer 200 in which the target VM is operated. Thereafter, by referring to the host-to-host connection management table 1134, it specifies all the host computers 200 connected to the specified host computer 200 via the first communication network (S3020).

Further, the VM migration destination host computer search program 1103 narrows down the host computer 200 capable of migrating the VM 2001 among the host computers specified in S3020 based on the virtual logical unit 510 specified in S3010 and the information of the volume access path management table 1131 (S3030). That is, in the present processing, the host computer 200 capable of accessing (having an access path to) the virtual logical unit 510 specified in S3010 can be specified.

Next, the VM migration destination host computer search program 1103 specifies the host computer 200 that is the migration destination candidate of the VM 2001 and that satisfies the requested service level of the target VM and other VMs 2001 even when the target VM is migrated, by performing 53040 through S3060 for all the host computers 200 specified in S3030.

At first, in 53040, the VM migration destination host computer search program 1103 calls the VM I/O performance estimation program 1102 by designating the identification information of the host computer 200 and the identification information of the target VM as arguments. The VM migration destination host computer search program 1103 judges whether the migration target VM 2001 and all the VMs 2001 operating in the host computer 200 will fulfil the requested service level or not by comparing the result of having returned the VM I/O performance estimation program 1102 and the information of the SLA management table 1133 (S3050). If the result is positive, the VM migration destination host computer search program 1103 selects the host computer 200 having computed the estimation as the host computer 200 being the migration destination candidate of the target VM (S3060). Further, if the result of S3050 is negative, the host computer 200 having computed the estimation is not selected as the host computer 200 being the migration destination candidate of the target VM.

After the processing of 53040 through S3060 have been performed for all the host computers 200 specified in S3030, the VM migration destination host computer search program 1103 judges whether one or more host computers 200 being the migration destination candidate of the target VM has been found as a result of 53040 though S3060 (S3070). If the result of S3070 is negative, the VM migration destination host computer search program 1103 returns to the call source program (VM migration plan generation program 1101) that there is no appropriate migration destination host computer 200 of the target VM, and ends the process.

On the other hand, if the result of S3070 is positive, the VM migration destination host computer search program 1103 selects one host computer 200 from the host computers 200 being the migration destination candidate selected in S3060 (S3080), returns the information of the selected host computer 200 (identifier of the host ID and the like) to the call source program, and ends the process. Various methods can be used as the selecting method performed here. For example, it can be the host computer 200 having the highest estimated performance computed in 53040. Further, selection can be performed using the information such as usage of the computing resource of the host computer 200.

In the aforementioned process S1070 of the VM migration plan generation program 1101, the process S2030 of the VM I/O performance estimation program 1102, and the process S3050 of the VM migration destination host computer search program 1103 in the present embodiment, the method for computing the estimation of response time of the VM 2001 and the method for judging whether the response time fulfils the requested value is shown. This is one example of the process for estimating the influence to the service level that the VM 2001 is capable of providing that may occur by migration of the VM 2001 between host computers 200 or switching of the path to the logical unit 390, and judging whether the VM 2001 fulfils a requested service level or not. The process similar to the method described above can be realized even when a metrics other than the response time is used as the metrics of the service level. For example, if the RTO is determined as service level metrics in the SLA management table 1133, in S2030, the change of data write time after the migration of the VM 2001 or the switching of the path should be estimated, and in S1070 or S3050, whether the result fulfils the value registered in the SLA management table 1133 or not should be judged.

As described above, according to the present embodiment, if the path that can be used from the host computer is reduced by the change of configuration of the storage subsystem, the host computer capable of satisfying the requested service level of the VM can be selected among the host computers within the computer system.

Second Embodiment (2-1) Outline of Present Embodiment

Next, a second embodiment will be described. Since the configuration of the computer system or the management information and the like managed by the relevant computer system according to the second embodiment are the same as the computer system described in the first embodiment, they will not be illustrated. Further, among the programs executed in the computer system according to the second embodiment, operation of the VM migration plan generation program 1101 somewhat differs from that described in the first embodiment, but the operation of other programs is similar to that described in the first embodiment. Therefore, in the following description, the points that differ from the operation of the VM migration plan generation program 1101 described in the first embodiment will mainly be described. In the first embodiment, if the path(s) that the host computer can use is/are either increased or not changed as a result of S1010 (S1010: No), the service level of the VM 2001 is not influenced, so that the VM migration plan generation program 1101 did not perform any specific processing. On the other hand, according to the present embodiment, if the path(s) that can be used by from the host computer is/are either increased or not as a result of S1010, the VM migration plan generation program 1101 judges whether the service level of the VM 2001 can be improved or not (for example, if the response time is used as the metrics of SLA, whether the response performance can be improved or not). Then, the information of the host computer (migration destination host computer 200 of the VM 2001) capable of improving the service level can be output. In the following description, a case is described where the response time can be utilized as the metrics of SLA, similar to the first embodiment.

(2-2) Details of Operation of Each Apparatus

Figure 22:
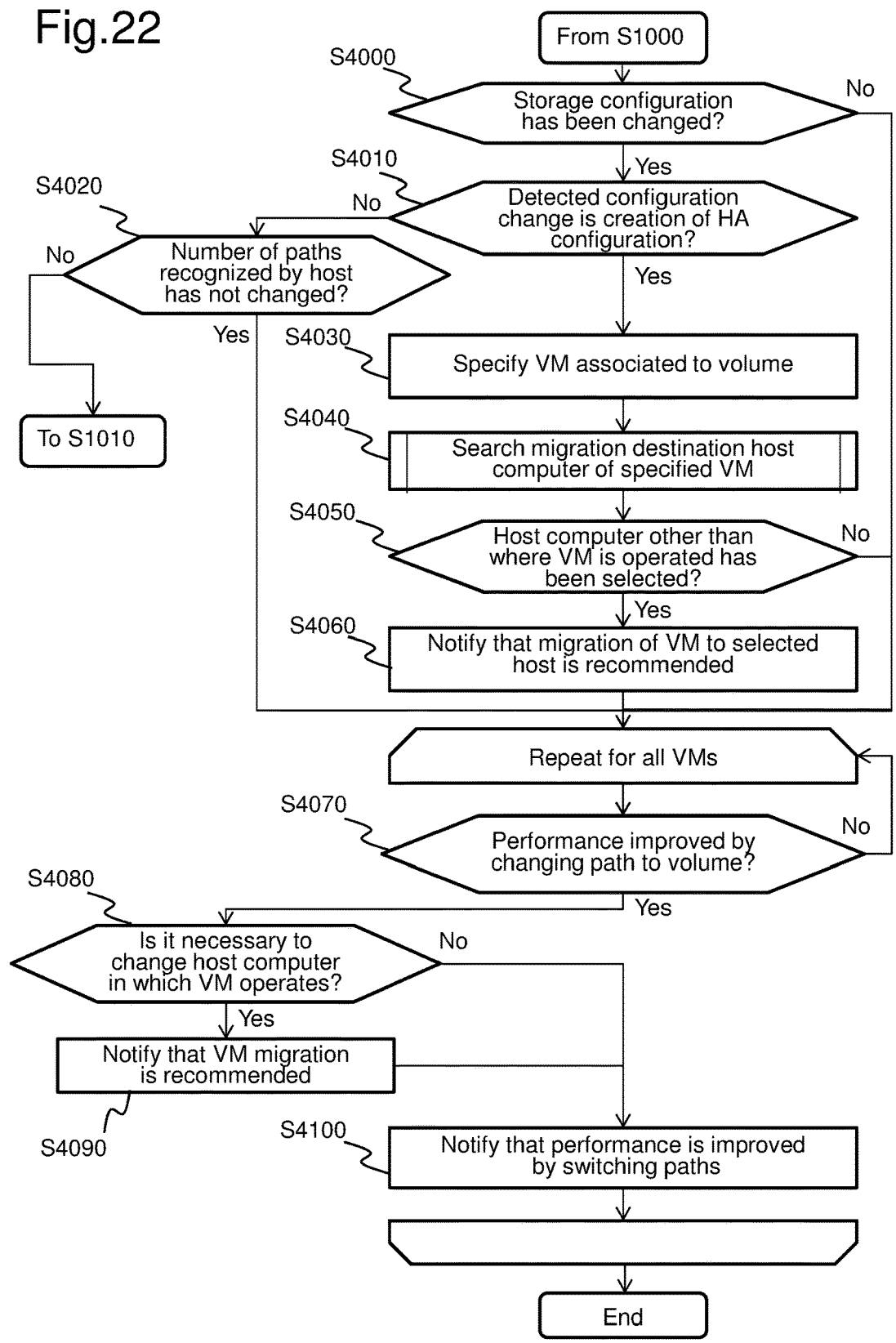
FIG. 22 is a flowchart illustrating a process for generating a plan for migrating a VM from one host computer to another according to second and third embodiments.

FIG. 22 illustrates an operation of the VM migration plan generation program 1101 according to the present embodiment. At first, the VM migration plan generation program 1101 according to the present embodiment performs the processes up to S1000, similar to the first embodiment. Next, the VM migration plan generation program 1101 judges whether the change of storage configuration has been detected or not in S1000 (S4000). The VM migration plan generation program 1101 performs the process of 54010 next if change of configuration is detected, and performs the process of S4070 next if change of configuration is not detected.

In 54010, the VM migration plan generation program 1101 judges whether or not the detected configuration change is an operation for increasing the path to the logical unit 390 or the virtual logical unit 510 recognized by the host computer 200. In the present embodiment, an example will be described of a case where the operation for increasing the path is the operation for setting the HA configuration.

If the result of judgment of 54010 is negative, the VM migration plan generation program 1101 judges whether the number of paths recognized by the host computer 200 has changed or not by the detected configuration change of the storage subsystem 300 (S4020). One such method is to monitor the change of the volume access path management table 1131. If the result of S4020 is positive and there is no increase or decrease of paths, the VM migration plan generation program 1101 executes the process of S4070 next. On the other hand, if the result of S4020 is negative and the number of paths has decreased, the VM migration plan generation program 1101 executes the processes of S1010 and thereafter described in the first embodiment.

If the result of judgment of 54010 is positive, the VM migration plan generation program 1101 specifies the VM 2001 corresponding to the virtual logical unit 510 where the path from the host computer 200 has increased according to the change of configuration by referring to the VM volume correspondence management table 1132 (S4030). Hereafter, the VM 2001 specified here is referred to as "target VM".

Next, the VM migration plan generation program 1101 calls the VM migration destination host computer search program 1103 using the identification information of the target VM as an argument, to search for an appropriate host computer 200 in which the target VM is to be operated (S4040).

Next, the VM migration plan generation program 1101 refers to the VM allocation management table 1135, and judges whether the host computer 200 specified in S4040 differs from the host computer in which the target VM (VM 2001 specified in S4030) is currently operating or not (S4050). If the result of S4050 is negative, since the target VM is already operating on the appropriate host computer 200, the VM migration plan generation program 1101 moves onto the execution of the process of S4070 without performing the process of 54060. On the other hand, if the result of S4050 is positive, the VM migration plan generation program 1101 determines that it is more appropriate to migrate the target VM to the host computer 200 searched in S4040, and outputs a notice to recommend migration of the target VM to the host computer 200 selected in S4040 to the input/output device 130 and the like.

Next, in the processes of S4070 and thereafter, the VM migration plan generation program 1101 judges whether the appropriate path to the logical unit 390 or the virtual logical unit 510 has changed or not by the change of state of the storage subsystem 300, and if the appropriate path has changed, it causes the host computer 200 to use the appropriate path.

The VM migration plan generation program 1101 performs the processes of S4070 to S4100 for all the VMs 2001 managed by the management computer 100. In S4070, the VM migration plan generation program 1101 judges whether or not the service level of the VM 2001 will be improved than the current service level by changing the path used by the host computer 200 (S4070). Specifically, it judges whether the I/O response performance with respect to the logical unit 390 (or the virtual logical unit 510) of the VM 2001 will be improved than the current performance (whether the response time will be shortened than the current state). The judgement can be done, for example, by specifying the combination of paths from the host computer 200 to which the VM 2001 can migrate to the logical unit 390 related to the VM 2001, based on the VM volume correspondence management table 1132, the volume access path management table 1131 and the host-to-host connection management table 1134. Then, a process similar to the estimation calculation process of S2030 of the VM I/O performance estimation program 1102 should be performed for the respective combinations of the path between the host computer 200 and the logical unit 390 and the VM 2001 having been specified.

If the result of S4070 is negative, the VM migration plan generation program 1101 will not perform any special process to the VM 2001 being the target of judgement since the VM 2001 is assumed to be issuing an I/O using an appropriate path on an appropriate host computer 200.

On the other hand, if the result of S4070 is positive, it means that the VM 2001 is operating on an inappropriate host computer 200, or issuing an I/O using an inappropriate path. Therefore, next in S4080, the VM migration plan generation program 1101 judges, based on the result of S4070, whether the VM 2001 is operating on an appropriate host computer 200 or not. If the VM 2001 is not operating on an appropriate host computer 200 (S4080: Yes), the VM migration plan generation program 1101 outputs a notice to the input/output device 130 to recommend migrating the VM 2001 (S4090).

Further, the VM migration plan generation program 1101 outputs information related to the appropriate path that the VM 2001 should use based on the result of S4070 to the input/output device 130 (S4100). For example, as the information on the path, a set of identification information of the host computer 200, the identification information of the logical unit 390 (or the virtual logical unit 510), and the identification information of the C-I/F 340 should be output. However, other information can also be output. For example, information showing the relationship between logical units of conglomerate LUNs standardized by the specification of SCSI Primary Commmands-5 can be included.

Moreover, in S4100, in addition to outputting the path information to the input/output device 130 (or instead of outputting information), the management computer 100 can notify the information of the path used for the I/O to the logical unit 390 or the virtual logical unit 510 to the host computer 200, so that the host computer 200 will use the path selected in S4100. Further, in S4100, the VM migration plan generation program 1101 can perform a process to the storage subsystem 300 to change the priority setting of the path that is returned to the host computer 200, so that the host computer 200 will use the path selected in S4100. Thereby, since the information of the path to be used with priority can be notified from the storage subsystem 300 to the host computer 200, the host computer will access the logical unit using the notified path.

As described, according to the present embodiment, if the path that the host computer can use has increased according to the change of configuration of the storage subsystem, in a case where a host computer satisfying the requested service level of the VM that is more appropriate than the host computer currently executing the VM exists, the appropriate host computer to which the VM should be migrated can be selected.

According further to the present embodiment, even if a change of state of the storage subsystem that has a bad influence on the service level of the VM does not occur, the appropriate host computer in which the VM should operate and the path can be selected. Or, the priority information of the path that the storage subsystem notifies to the host computer can be appropriately changed.

Third Embodiment (3-1) Outline of Present Embodiment

Next, a third embodiment will be described. Since the configuration of the computer system or the management information and the like managed by the relevant computer system according to the third embodiment are similar to those described in the first and second embodiments, they will not be illustrated. In the computer system according to the third embodiment, the operation of the VM migration destination host computer search program 1103 somewhat differs from that described in the first or second embodiments, but the other properties are similar to those described in the first or second embodiments. Therefore, in the following description, mainly the points that differ from the first or second embodiments will be described. In the first and second embodiments, an example has been illustrated where, in S3030, the VM migration destination host computer search program 1103 selects a host computer 200 capable of accessing (having an access path to) the logical unit 390 or the virtual logical unit 510 in which the disk image of the VM 2001 is stored. On the other hand, according to the present embodiment, if the reason why a host computer 200 cannot access the logical unit 390 or the virtual logical unit 510 is in the setting of the storage subsystem 300, for example, the relevant host computer 200 can be selected as the migration destination of the VM 2001 under the condition that the setting of the storage subsystem 300 is changed to enable access from the host computer 200 to the logical unit 390 or the virtual logical unit 510.

(3-2) Details of Operation of Each Apparatus

Figure 23:
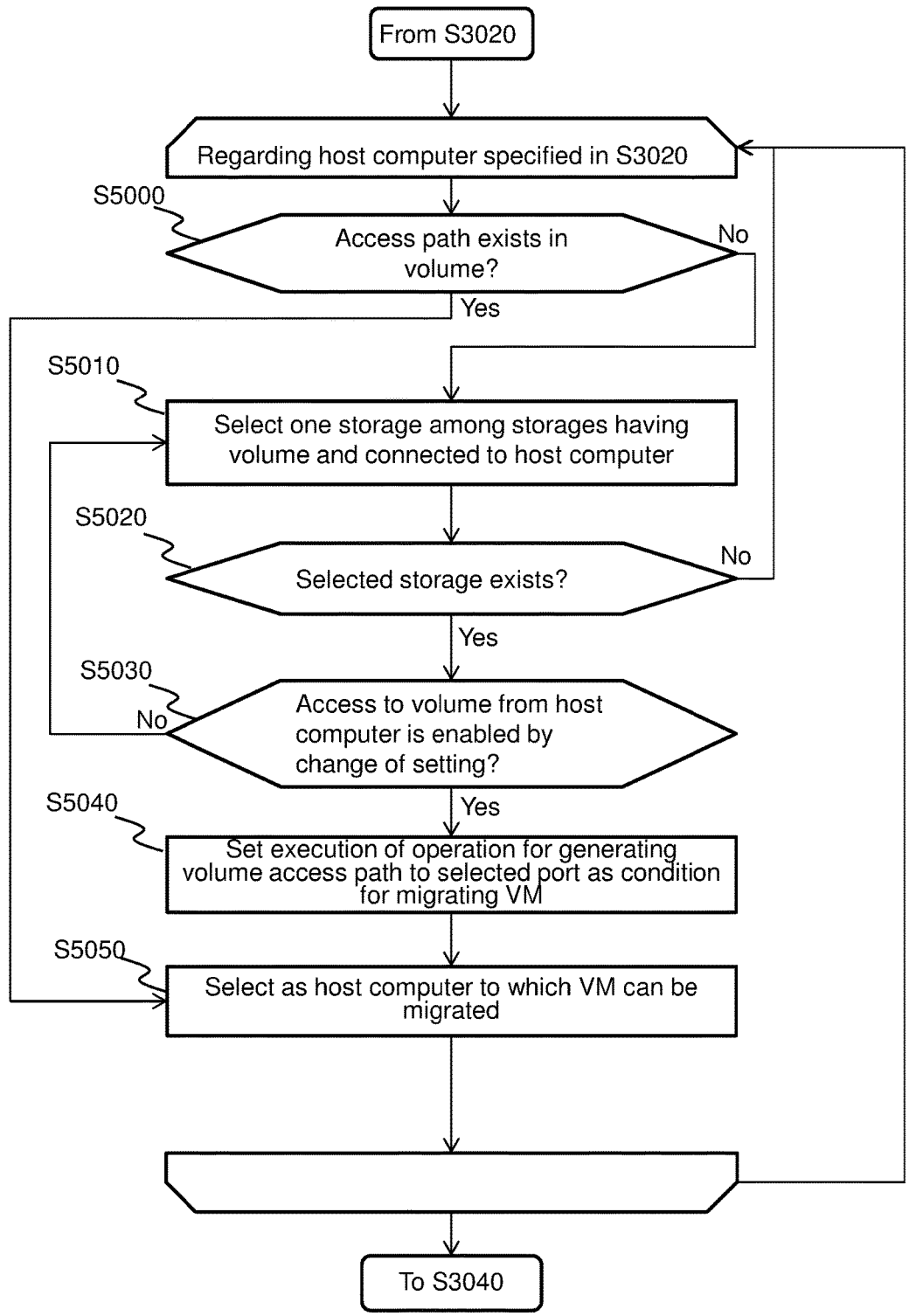
FIG. 23 is a flowchart illustrating a process for specifying a host computer being the migration destination of VM according to the third embodiment.

FIG. 23 shows an operation of the VM migration destination host computer search program 1103 according to the present embodiment. At first, the VM migration destination host computer search program 1103 according to the present embodiment performs processes of S3000 through S3020 of FIG. 21, similar to the first embodiment. Next, the VM migration destination host computer search program 1103 checks whether or not each host computer 200 specified in S3020 has a path to the logical unit 390 or the virtual logical unit 510 specified in S3010 (S5000). As a result, if there is a path, the host computer 200 is set as the migration target destination of the VM 2001, similar to S3030 of the first embodiment. On the other hand, if there is no path, the processes of S5010 and thereafter will be performed.

Next, the VM migration destination host computer search program 1103 refers to the network performance management table 1123 and the volume configuration information table 1111, and selects one of the storage subsystems 510 connected to the host computer 200 specified in S3020 and having the logical unit 390 specified in S3010 or the logical unit 390 corresponding to the virtual logical unit 510 (S5010). For example, an access time from the host computer 200 and the like can be used as the criteria of selection of the storage subsystem 300.

The VM migration destination host computer search program 1103 judges whether there is a storage subsystem 300 that fulfils the condition of S5010 or not (S5020), and if not, excludes the host computer 200 being the target of judgement from the migration destination candidate of the VM 2001. If there is, the processes of S5030 and thereafter may further be performed to the relevant host computer 200.

Next, the VM migration destination host computer search program 1103 judges whether access from the host computer 200 to the logical unit 390 or the virtual logical unit 510 specified in S3010 becomes possible or not (whether an access path can be formed or not) by changing the setting of the storage subsystem 300 specified in S5020 (S5030). Here, the change of setting of the storage subsystem 300 refers, for example, to the change of setting of the LUN masking. The judgement of whether change of setting is possible or not is based, for example, on whether or not a LUN masking setting can be performed to enable the logical unit 390 or the virtual logical unit 510 specified in S3010 to be accessed from the host computer 300 with respect to the C-I/F 340 to which the host computer 200 is connected. These are merely an example, and other operations for changing the setting of the storage subsystem are possible.

If the result of S5030 is negative, the VM migration destination host computer search program 1103 performs the process of S5010 again after excluding the storage subsystem 300 checked in S5030 from the candidate.

On the other hand, if the result of S5030 is positive, the VM migration destination host computer search program 1103 stores information to perform change of setting of the storage subsystem 300 as the condition for selecting a host computer as the migration destination of the VM 2001 in the storage resource 110 of the management computer 100 (S5040), and then selects the host computer 200 as the host computer to which the VM 2001 can be migrated (S5050). Thereafter, the VM migration destination host computer search program 1103 performs the processes of 53040 and thereafter of FIG. 21.

In the present embodiment, in S1100, the VM migration plan generation program 1101 notifies the condition stored in the storage resource 110 in S5040 together with the information of the migration destination host computer 200 when outputting the migration destination host computer 200 of the VM 2001.

If the management computer 100 has an authority to change the configuration of the storage subsystem 300, it is possible to instruct to the storage subsystem 300 an operation to change the storage configuration determined as required in S5030 at a timing for executing S5040 or at a timing for executing S1100. The timing for changing the setting of the storage illustrated here is merely an example, and the storage setting can be changed at other timings. For example, the management computer 100 can perform the storage change operation at an arbitrary timing by storing the correspondence between the VM 2001, the migration destination host computer 200, and the necessary storage setting change operation held in the storage resource 110 in S5040. For example, the timing can be when the VM 2001 is actually migrated to the host computer 200.

The third embodiment has been described above. According to the present embodiment, it becomes possible to judge whether there is a host computer that is more appropriate than the host computer in which the VM is currently executed as the host computer capable of satisfying the requested service level of the VM, by taking into consideration the change of storage configuration or the change of setting of the storage subsystem by the contents of change of state of the storage, and if a host computer that is more appropriate than the current one exists, a guideline to change the necessary setting of the storage subsystem and the migration destination host computer of the VM can be proposed.

The embodiments of the present invention has been described above, but they are merely examples for describing the present invention, and they are not intended to restrict the scope of the present invention to the illustrated embodiments. The present invention can also be implemented in various other embodiments.

In the preferred embodiments described above, an example has been illustrated where the VM operates in the respective host computers, and the management computer notifies a migration destination host computer capable of satisfying the service level required in the VM to the user (administrator) by outputting the information to the input/output device when a change of state such as the change of configuration of the storage subsystem occurs. However, the object being the target of migration between host computers is not restricted to VMs. For example, the present invention is also effective in a computer system in which a VM is not operating. In a computer system in which a VM is not operating, when a change of state of the storage subsystem occurs, the management computer can search for a migration destination host computer capable of satisfying the service level of an application program (AP) via a method similar to the embodiments described above, and output the result to the input/output device. In that case, the user can change the configuration of the computer system to have the AP executed in a migration destination host computer based on the contents of the notice.

Furthermore, the respective embodiments described above mainly describes a process performed in a configuration illustrated in FIG. 4, that is, a configuration where the VM accesses a single virtual logical unit to which two logical units having an HA configuration is mapped, but the present invention can also be executed in other configurations. For example, the present invention is also effective when implemented in a configuration where the VM or the AP accesses the logical unit (which is not a virtual logical unit) having a plurality of access paths from the host computer.

This is described with reference to FIG. 4. For example, in the lower section (b) of FIG. 4, a configuration is illustrated where the respective host computers 200 access the virtual logical unit 510 of the virtual storage subsystem 500, wherein a configuration is assumed where this virtual storage 500 is a single storage subsystem 300 and the virtual logical unit 510 is a single logical unit 390. Here, there are two access paths from the host computer 200 (a) to the logical unit, which are a path passing storage port 520 (a) (referred to as "path A") and a path passing storage port 520 (b) (referred to as "path B").

Depending on the network configuration of the host computer 200 and the storage subsystem 300, the network performance (latency) of path A and the network performance of path B may not be equivalent. For example, it is assumed that the network performance of path B is significantly deteriorated than the network performance of path A. In that case, when failure occurs to path A (such as C-I/F) and the host computer 200 (a) switches the path for accessing the logical unit to path B, the I/O performance (response performance) is deteriorated, so that it may not be possible for the object (VM or AP) being executed in the host computer to satisfy the requested service level.

By using the present invention, the management computer can detect that a failure has occurred to path A, and at that timing, the computer can judge whether the requested service level can be satisfied by executing VM or AP in the host computer 200 (b), and if the requested service level cannot be satisfied, the information can be notified to the user.

The respective embodiments described above have been illustrated mainly based on a case where the management computer outputs the migration destination of the VM (or the object being executed in the host computer, such as AP) to the input/output device, but as another example, the management computer can issue an instruction to migrate the VM (or the AP and the like) to thereby cause the host computer to migrate the VM (or the AP).

REFERENCE SIGNS LIST

100 Management computer, 200 Host computer, 300 Storage subsystem, 500 Virtual storage subsystem

The invention claimed is:

1. A management computer for managing a computer system configured of a plurality of host computers and a storage system having one or more storage subsystems connected via a network;

the storage system comprising a volume where a plurality of access paths from the host computers are provided;

the management computer managing a configuration information of the volume and the host computers, a performance information of the computer system, and a requested service level of an object executed in the host computers, wherein if the management computer detects that there has been a change in a configuration of the storage system, the management computer:

calculates a service level capable of being provided when the object is executed in each of the plurality of host computers based on the configuration information and the performance information, and based on the calculated result, selects the host computer capable of satisfying the requested service level if the object is executed, wherein a storage subsystem is configured to notify an access path among the plurality of the access paths from a host computer that should be used with priority to the host computer, and if an access path capable of satisfying the requested service level when the object is executed exists, the management computer causes the storage subsystem to notify the information of the access path as the access path that should be used with priority to the at least one storage subsystem.

2. The management computer according to claim 1, wherein the management computer calculates the service level capable of being provided when the object is executed in each of the plurality of host computers in each access path from the host computer to the volume to which the object accesses, and based on the calculated result, selects the information of the access path capable of satisfying the requested service level when the object is executed.

3. The management computer according to claim 2, wherein if the access path capable of satisfying the requested service level when the object is executed exists, the management computer notifies the information of the access path to the host computer.

4. The management computer according to claim 2, wherein if it is judged that the service level capable of being provided when the object is executed in the host computer will be improved than the current service level by changing the access path that the host computer uses to access the volume, and the management computer outputs an information of the access path capable of improving the service level provided if the object is executed compared to the current service level.

5. The management computer according to claim 1, wherein when the management computer calculates a service level capable of being provided when the object is executed in each of the plurality of host computers, the management computer calculates the service level capable of being provided to the host computer having the access path to the volume.

6. The management computer according to claim 1, wherein if the change of configuration of the storage system being detected is a change where a number of access paths from the host computer to the volume decreases, the management computer:

judges whether the requested service level can be satisfied or not if the object is executed in the host computer in which the object is currently being executed, and only if it is judged that the requested service level cannot be satisfied, the management computer calculates the service level that can be provided when the object is executed in each of the plurality of host computers, and based on the result of the calculation, selects the host computer capable of satisfying the requested service level in a state where the object is executed.

7. The management computer according to claim 6, wherein the host computer executes a plurality of the objects, if the detected change of configuration of the storage system is the change in which the number of access paths to the volume decreases, the management computer judges whether the object using the volume fulfils the requested service level, and if the object using the volume does not fulfil the requested service level, the management computer:

calculates the service level capable of being provided if the object using the volume is executed in each of the plurality of host computers, and selects the host computer capable of satisfying the requested service level for all the objects executed in the host computer in addition to the object using the volume.

8. The management computer according to claim 1, wherein if it is judged that there is no host computer capable of satisfying the requested service level when the object is executed, the management computer outputs a notice notifying that there is no host computer capable of satisfying the requested service level if the object is executed to an input/output device of the management computer.

9. The management computer according to claim 1, wherein the object is a virtual machine.

10. The management computer according to claim 1, wherein the service level is an I/O response time when the object accesses the volume.

11. The management computer according to claim 1, wherein the storage system includes a first storage subsystem having a first logical unit and a second storage subsystem having a second logical unit, the first logical unit and the second logical unit are configured to be accessible from the host computer as an identical volume, and the host computer is configured to change an access destination to the second logical unit if access to the first logical unit is disabled.

12. The management computer according to claim 11, wherein if the access to the first logical unit is disabled, the management computer determines that the configuration of the storage system has been changed.

13. A management computer for managing a computer system configured of a plurality of host computers and a storage system having one or more storage subsystems connected via a network;

the storage system comprising a volume where a plurality of access paths from the host computers are provided;

the management computer managing a configuration information of the volume and the host computers, a performance information of the computer system, and a requested service level of an object executed in the host computers, wherein if the management computer detects that there has been a change in a configuration of the storage system, the management computer:

calculates a service level capable of being provided when the object is executed in each of the plurality of host computers based on the configuration information and the performance information, and based on the calculated result, selects the host computer capable of satisfying the requested service level if the object is executed, wherein if a host computer having no access path to the volume exists, the management computer:

judges whether an access path to the host computer can be formed by changing a setting of the storage subsystem, and if the access path can be formed, calculates the service level capable of being provided, even for the host computer having no access path to the volume.

14. A method for managing a computer system configured of a plurality of host computers and a storage system having one or more storage subsystems connected via a network;

the storage system comprising a volume where a plurality of access paths from the host computers are provided;

a management computer managing the computer system being a computer managing a configuration information of the volume and the host computers, a performance information of the computer system, and a requested service level of an object executed in the host computers, the method executed by the management computer comprising:

detecting that there has been a change in a configuration of the storage system, calculating a service level capable of being provided when the object is executed in each of the plurality of host computers, and selecting the host computer capable of satisfying the requested service level when the object is executed based on the calculated result, wherein a storage subsystem is configured to notify an access path among the plurality of the access paths from a host computer that should be used with priority to the host computer, and if an access path capable of satisfying the requested service level when the object is executed exists, the management computer causes the storage subsystem to notify the information of the access path as the access path that should be used with priority to the at least one storage subsystem.

* * * * *